United States Patent
Nagashima et al.

(10) Patent No.: US 9,423,982 B2
(45) Date of Patent: Aug. 23, 2016

(54) STORAGE CONTROL APPARATUS, CONTROL METHOD, AND COMPUTER PRODUCT

(71) Applicant: FUJITSU LIMITED, Kawasaki-shi, Kanagawa (JP)

(72) Inventors: Chiaki Nagashima, Nagoya (JP); Kenichi Fujita, Nagoya (JP); Hiroshi Murayama, Fuji (JP); Tsuyoshi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/464,984

(22) Filed: Aug. 21, 2014

(65) Prior Publication Data

US 2015/0074348 A1 Mar. 12, 2015

(30) Foreign Application Priority Data

Sep. 10, 2013 (JP) ................................. 2013-187754

(51) Int. Cl.
*G06F 3/06* (2006.01)

(52) U.S. Cl.
CPC ............ *G06F 3/0665* (2013.01); *G06F 3/065* (2013.01); *G06F 3/0607* (2013.01); *G06F 3/067* (2013.01); *G06F 3/0608* (2013.01); *G06F 3/0613* (2013.01); *G06F 3/0617* (2013.01); *G06F 3/0635* (2013.01); *G06F 3/0689* (2013.01)

(58) Field of Classification Search
CPC ......... G06F 3/06; G06F 3/0674; G06F 12/00
USPC .......................................... 711/100, 114, 154
See application file for complete search history.

(56) References Cited

U.S. PATENT DOCUMENTS

| 6,931,487 | B2 * | 8/2005 | Lubbers | ............... G06F 11/2092 711/114 |
| 7,523,286 | B2 * | 4/2009 | Ramany | ................ G06F 3/0605 710/240 |
| 2004/0024964 | A1 | 2/2004 | Taninaka et al. | |
| 2008/0235448 | A1 | 9/2008 | Inoue et al. | |
| 2012/0278543 | A1 | 11/2012 | Yu et al. | |

FOREIGN PATENT DOCUMENTS

| EP | 1369772 A2 | 12/2003 |
| JP | 2003-330762 | 11/2003 |
| JP | 2008-234158 | 10/2008 |

OTHER PUBLICATIONS

Extended European Search Report dated Jan. 20, 2015 in corresponding European Patent Application No. 14182256.9.

* cited by examiner

*Primary Examiner* — Tuan Thai
(74) *Attorney, Agent, or Firm* — Staas & Halsey LLP

(57) ABSTRACT

A storage control apparatus includes a memory unit configured to store assignment information that includes assignment states of memory areas of storage units in a system in which switches that connect the storage units with storage control apparatuses that control the storage units are cascade-connected to each other; and a control unit configured to group the storage control apparatuses and the storage units directly connected to the switches, and to provide based on the assignment information, rearrangement control of memory areas assigned in the storage units belonging to each group.

7 Claims, 31 Drawing Sheets

FIG.10

VOLUME INDEX TABLE ~1000

| | VOLUME NUMBER | VOLUME NAME | OPERATING PU NUMBER | VOLUME ATTRIBUTE | VOLUME SIZE | VOLUME STATE | REARRANGEMENT STATUS |
|---|---|---|---|---|---|---|---|
| 1000-1 | 1 | Vdisk1 | 1 | THIN PROVISIONING VOLUME | 500 | NORMAL | UNDER REARRANGEMENT |
| 1000-2 | 2 | Vdisk2 | 2 | THIN PROVISIONING VOLUME | 700 | NORMAL | UNDER REARRANGEMENT |
| | 3 | 8k-volume | 1 | STANDARD VOLUME | 530 | NORMAL | AWAITING REARRANGEMENT |
| | 4 | Dev001 | 2 | THIN PROVISIONING VOLUME | 1024 | NORMAL | AWAITING REARRANGEMENT |
| | 5 | Mirror002 | 1 | MIRROR VOLUME | 580 | NORMAL | AWAITING REARRANGEMENT |
| | : | : | : | : | : | : | : |
| | 127 | #mir-001 | 5 | MIRROR VOLUME | 750 | NORMAL | AWAITING REARRANGEMENT |
| | 128 | #mir-002 | 5 | MIRROR VOLUME | 750 | ABNORMAL | AWAITING REARRANGEMENT |
| | : | : | : | : | : | : | : |
| 1000-n | n | NULL (0) | -1 | UNDEFINED | 0 | UNDEFINED | NOT TO BE REARRANGED |

FIG.11

MIRROR VOLUME INDEX TABLE ~1100

| VOLUME NUMBER | MIRROR COUNT | MIRROR VOLUME NUMBER 1 | MIRROR VOLUME NUMBER 2 |
|---|---|---|---|
| 2 | 2 | 127 | 128 |
| 5 | 2 | 221 | 223 |
| : | : | : | : |
| n | -1 | -1 | -1 |

FIG.12

VOLUME SEGMENT TABLE 1200

| VOLUME NUMBER | SEGMENT SET NUMBER | SEGMENT NUMBER | SW GROUP NUMBER | STORAGE APPARATUS | LUN NUMBER | SEGMENT STATE |
|---|---|---|---|---|---|---|
| 1 | 1 | 1 | 1 | 1 | 1 | VALID |
| 1 | 1 | 2 | 1 | 1 | 2 | VALID |
| .. | .. | .. | .. | .. | .. | .. |
| 1 | 1 | 8 | 1 | 1 | 8 | VALID |
| 1 | 2 | 1 | 1 | 1 | 1 | VALID |
| 1 | 2 | 2 | 1 | 1 | 2 | VALID |
| .. | .. | .. | .. | .. | .. | .. |
| 1 | 2 | 8 | 1 | 1 | 8 | VALID |
| 1 | 3 | 1 | 1 | 1 | 1 | VALID |
| 1 | 3 | 2 | 1 | 1 | 2 | VALID |
| .. | .. | .. | .. | .. | .. | .. |
| 701 | 1 | 1 | 2 | 7 | 1 | VALID |
| 701 | 1 | 2 | 2 | 7 | 2 | VALID |
| .. | .. | .. | .. | .. | .. | .. |

REARRANGEMENT PLAN TABLE 720

| VOLUME NUMBER | SEGMENT SET NUMBER | SEGMENT NUMBER | SW GROUP NUMBER | CURRENT STORAGE APPARATUS | CURRENT LUN NUMBER | REARRANGED STORAGE APPARATUS | REARRANGED LUN NUMBER | REARRANGEMENT STATUS |
|---|---|---|---|---|---|---|---|---|
| 1 | 1 | 1 | 1 | 1 | 1 | 1 | 1 | REARRANGEMENT NOT REQUIRED |
| 1 | 1 | 2 | 1 | 1 | 2 | 1 | 2 | REARRANGEMENT NOT REQUIRED |
| 1 | 1 | 3 | 1 | 1 | 3 | 1 | 3 | REARRANGEMENT NOT REQUIRED |
| 1 | 1 | 4 | 1 | 1 | 4 | 1 | 4 | REARRANGEMENT NOT REQUIRED |
| 1 | 1 | 5 | 1 | 2 | 1 | 2 | 1 | REARRANGEMENT NOT REQUIRED |
| .. | .. | .. | .. | .. | .. | .. | .. | .. |
| 1 | 1 | 8 | 1 | 2 | 4 | 2 | 4 | REARRANGEMENT NOT REQUIRED |
| 1 | 2 | 1 | 1 | 1 | 1 | 1 | 1 | REARRANGEMENT NOT REQUIRED |
| 1 | 2 | 2 | 1 | 1 | 2 | 1 | 2 | REARRANGEMENT NOT REQUIRED |
| .. | .. | .. | .. | .. | .. | .. | .. | .. |
| 1 | 2 | 8 | 1 | 2 | 4 | 2 | 4 | REARRANGEMENT NOT REQUIRED |
| .. | .. | .. | .. | .. | .. | .. | .. | .. |
| 701 | 1 | 1 | 2 | 7 | 1 | 7 | 1 | REARRANGEMENT NOT REQUIRED |
| 701 | 1 | 2 | 2 | 7 | 2 | 8 | 1 | UNDER REARRANGEMENT |
| 701 | 1 | 3 | 2 | 7 | 3 | 7 | 3 | REARRANGEMENT NOT REQUIRED |
| 701 | 1 | 4 | 2 | 7 | 4 | 8 | 2 | UNDER REARRANGEMENT |
| .. | .. | .. | .. | .. | .. | .. | .. | .. |

| ITEM | CONDITION | BEFORE REARRANGEMENT | AFTER REARRANGEMENT | SUPPLEMENT |
|---|---|---|---|---|
| 1 | ADD 8.4 TB TO BASIC SET 8.4 TB | SU #1: 8.4 TB | SU #1: 4.2 TB, SU #2: 4.2 TB | DISTRIBUTE ARRANGEMENT TO EQUALIZE PHYSICAL USAGE QUANTITIES |
| 2 | ADD 16.8 TB TO BASIC SET 8.4 TB | SU #1: 8.4 TB | SU #1: 4.2 TB, SU #2: 4.2 TB | DISTRIBUTE ARRANGEMENT TO EQUALIZE PHYSICAL USAGE QUANTITIES |
| 3 | ADD 16.8 TB TO BASIC+ONE EXPANSION (TOTAL 16.8 TB) | SU #1: 8.4 TB, SU #2: 8.4 TB | SU #1: 5.6 TB, SU #2: 5.6 TB, SU #3: 5.6 TB | DISTRIBUTE ARRANGEMENT TO EQUALIZE PHYSICAL USAGE QUANTITIES |

FIG.16

BEFORE REARRANGEMENT

SU #1

| A0 | A1 | A2 | A3 | A4 | A5 | A6 | A7 |
|---|---|---|---|---|---|---|---|
| A8 | A9 | A10 | A11 | A12 | A13 | A14 | A15 |
| A16 | A17 | A18 | A19 | A20 | A21 | A22 | A23 |
| A24 | A25 | A26 | A27 | A28 | A29 | A30 | A31 |
| B0 | B1 | B2 | B3 | B4 | B5 | B6 | B7 |
| B8 | B9 | B10 | B11 | B12 | B13 | B14 | B15 |

SU #2

(empty)

⇩

REARRANGEMENT DRAFT

SU #1

| A0 | A1 | A2 | A3 | A4 | A5 | A6 | A7 |
|---|---|---|---|---|---|---|---|
| A16 | A17 | A18 | A19 | A20 | A21 | A22 | A23 |
| B0 | B1 | B2 | B3 | B4 | B5 | B6 | B7 |

SU #2

| A8 | A9 | A10 | A11 | A12 | A13 | A14 | A15 |
|---|---|---|---|---|---|---|---|
| A24 | A25 | A26 | A27 | A28 | A29 | A30 | A31 |
| B8 | B9 | B10 | B11 | B12 | B13 | B14 | B15 |

⇩

UNDER REARRANGEMENT

SU #1

| A0 | A1 | A2 | A3 | A4 | A5 | A6 | A7 |
|---|---|---|---|---|---|---|---|
| | | | | | | | |
| A16 | A17 | A18 | A19 | A20 | A21 | A22 | A23 |
| | | | | | | | |
| B0 | B1 | B2 | B3 | B4 | B5 | B6 | B7 |
| B8 | B9 | B10 | B11 | B12 | B13 | B14 | B15 |

SU #2

| A8 | A9 | A10 | A11 | A12 | A13 | A14 | A15 |
|---|---|---|---|---|---|---|---|
| A24 | A25 | A26 | A27 | A28 | A29 | A30 | A31 |

⇩

AFTER REARRANGEMENT

SU #1

| A0 | A1 | A2 | A3 | A4 | A5 | A6 | A7 |
|---|---|---|---|---|---|---|---|
| | | | | | | | |
| A16 | A17 | A18 | A19 | A20 | A21 | A22 | A23 |
| | | | | | | | |
| B0 | B1 | B2 | B3 | B4 | B5 | B6 | B7 |

SU #2

| A8 | A9 | A10 | A11 | A12 | A13 | A14 | A15 |
|---|---|---|---|---|---|---|---|
| A24 | A25 | A26 | A27 | A28 | A29 | A30 | A31 |
| B8 | B9 | B10 | B11 | B12 | B13 | B14 | B15 |

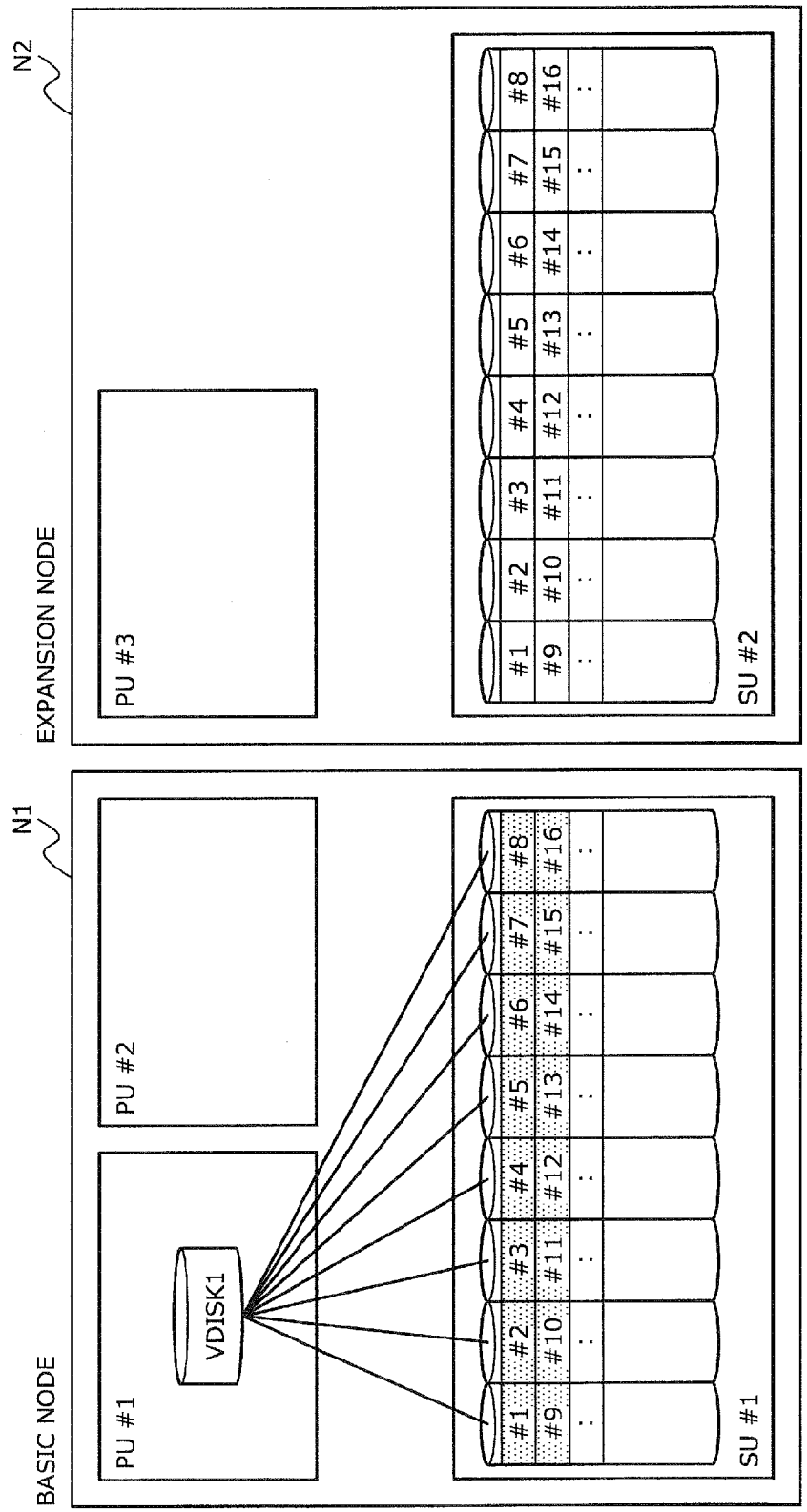

FIG.18

| VOLUME NUMBER | VOLUME NAME | OPERATING PU NUMBER | VOLUME ATTRIBUTE | VOLUME SIZE | VOLUME STATE | REARRANGEMENT STATUS |
|---|---|---|---|---|---|---|
| 1 | Vdisk 1 | 1 | THIN PROVISIONING VOLUME | 500 | NORMAL | UNDER REARRANGEMENT |
| -1 | NULL (0) | -1 | UNDEFINED | 0 | UNDEFINED | NOT TO BE REARRANGED |
| -1 | NULL (0) | -1 | UNDEFINED | 0 | UNDEFINED | NOT TO BE REARRANGED |
| -1 | NULL (0) | -1 | UNDEFINED | 0 | UNDEFINED | NOT TO BE REARRANGED |
| .. | .. | .. | .. | .. | .. | .. |
| -1 | NULL (0) | -1 | UNDEFINED | 0 | UNDEFINED | NOT TO BE REARRANGED |

FIG.19

FIG.21
(i) CONNECTION OF SU #6
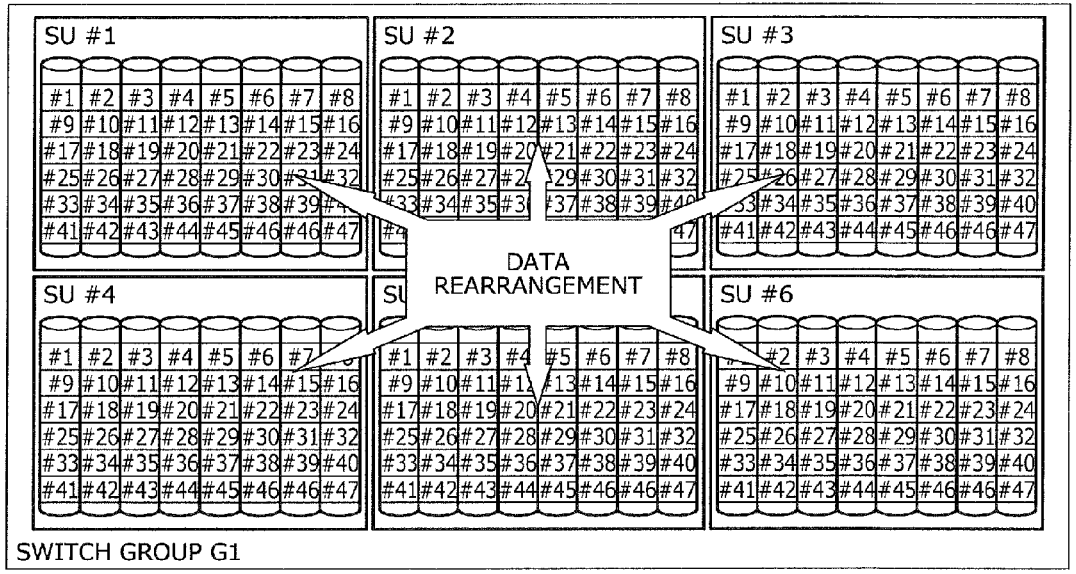
(ii) EXPANSION OF SU #7
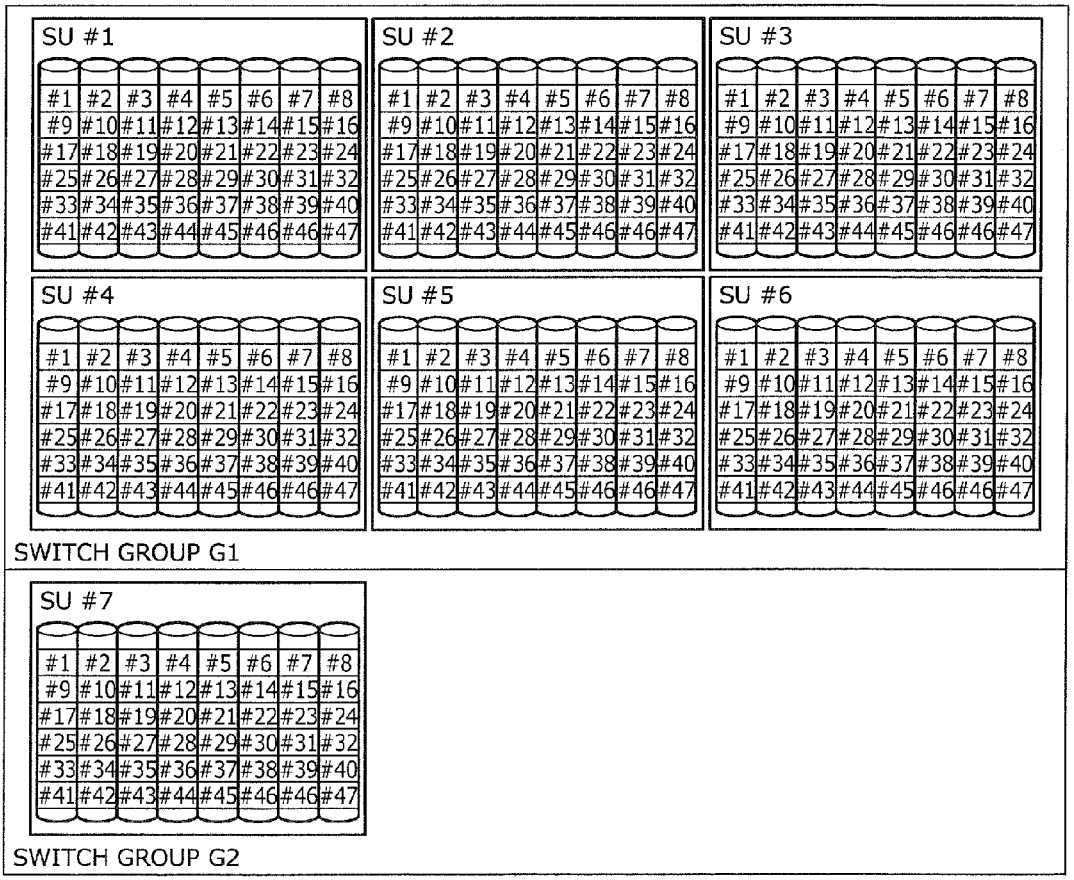

STORAGE CONTROL APPARATUS, CONTROL METHOD, AND COMPUTER PRODUCT

CROSS REFERENCE TO RELATED APPLICATIONS

This application is based upon and claims the benefit of priority of the prior Japanese Patent Application No. 2013-187754, filed on Sep. 10, 2013, the entire contents of which are incorporated herein by reference.

FIELD

The embodiments discussed herein are related to a storage control apparatus, a control method, and a computer product.

BACKGROUND

Storage for a virtual environment, i.e., a so-called virtual storage apparatus has been present as a storage system capable of realizing a memory device having free volume configuration and storage capacity without being restricted by volume configuration and storage capacity of a physical memory device. The virtual storage apparatus has within the apparatus a real storage apparatus controlling access to a physical memory device and creates a virtual volume with a processor managing the real storage apparatus.

The virtual storage apparatus performs data access through wide striping, for example. Wide striping is a technique of distributing data access of one volume to multiple logical unit numbers (LUNs) such that access is performed in units called strips having a fixed length.

As the memory capacity required for the virtual storage apparatus increases, the entire memory area of the virtual storage apparatus may be expanded. A method of expanding the entire memory area of the virtual storage apparatus may be, for example, addition of an expansion set that is a set including a processor that manages a real storage apparatus and the real storage apparatus.

To enable a fallback at the occurrence of a failure such as a failure of a processor in a virtual storage apparatus, the processors and the real storage apparatuses in the virtual storage apparatus may be connected in full mesh via a switch. If a switch is added in association with addition of an expansion set to the virtual storage apparatus, the switches are cascade-connected to realize full mesh connection of the processors and the real storage apparatuses.

Related technologies include, for example, a technique of forming groups of multiple disks to assign respective memory areas from multiple groups to virtual volumes and rearranging the memory areas of the groups used by the virtual volumes based on an external operation. Another related technology is a storage system having multiple switch ports and configured to include a switch such that if a data frame is input to a certain switch port, the switch outputs the data frame to a switch port leading to a connection port having the address specified by the data frame. For examples of such technologies, refer to Japanese Laid-Open Patent Publication Nos. 2008-234158 and 2003-330762.

Nonetheless, the conventional techniques have a problem in that, at the time of access of data distributed and arranged in multiple real storage apparatuses in a system, communication traffic increases on a route of cascade connection between switches, resulting in deterioration in access performance to the real storage apparatuses.

SUMMARY

According to an aspect of an embodiment, a storage control apparatus includes a memory unit configured to store assignment information that includes assignment states of memory areas of storage units in a system in which switches that connect the storage units with storage control apparatuses that control the storage units are cascade-connected to each other; and a control unit configured to group the storage control apparatuses and the storage units directly connected to the switches, and to provide based on the assignment information, rearrangement control of memory areas assigned in the storage units belonging to each group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is an explanatory view of an example of the contents of a volume index table 1000;

FIG. 11 is an explanatory view of an example of the contents of a mirror volume index table 1100;

FIG. 12 is an explanatory view of an example of the contents of a volume segment table 1200;

FIG. 14 is an explanatory view (part two) of an example of the contents of the rearrangement plan table 720;

FIG. 15 is an explanatory view of an example of a volume rearrangement plan;

FIG. 16 is an explanatory view (part one) of a rearrangement example of volumes;

FIG. 17 is an explanatory view of an arrangement example of volumes;

FIG. 18 is an explanatory view of an update example of the volume index table 1000;

FIG. 19 is an explanatory view of an update example of the rearrangement plan table 720;

FIGS. 21 and 22 are explanatory views of an example of data rearrangement at the time of addition of SUs;

DESCRIPTION OF EMBODIMENTS

Embodiments of a storage control apparatus, a control method, and a computer product according to the present invention will be described with reference to the drawings. In the description, a storage control apparatus, a storage unit, and a switch may be referred to as a "PU (Processor Unit)", an "SU (storage unit)", and an "SW (switch)", respectively.

Figure 1:
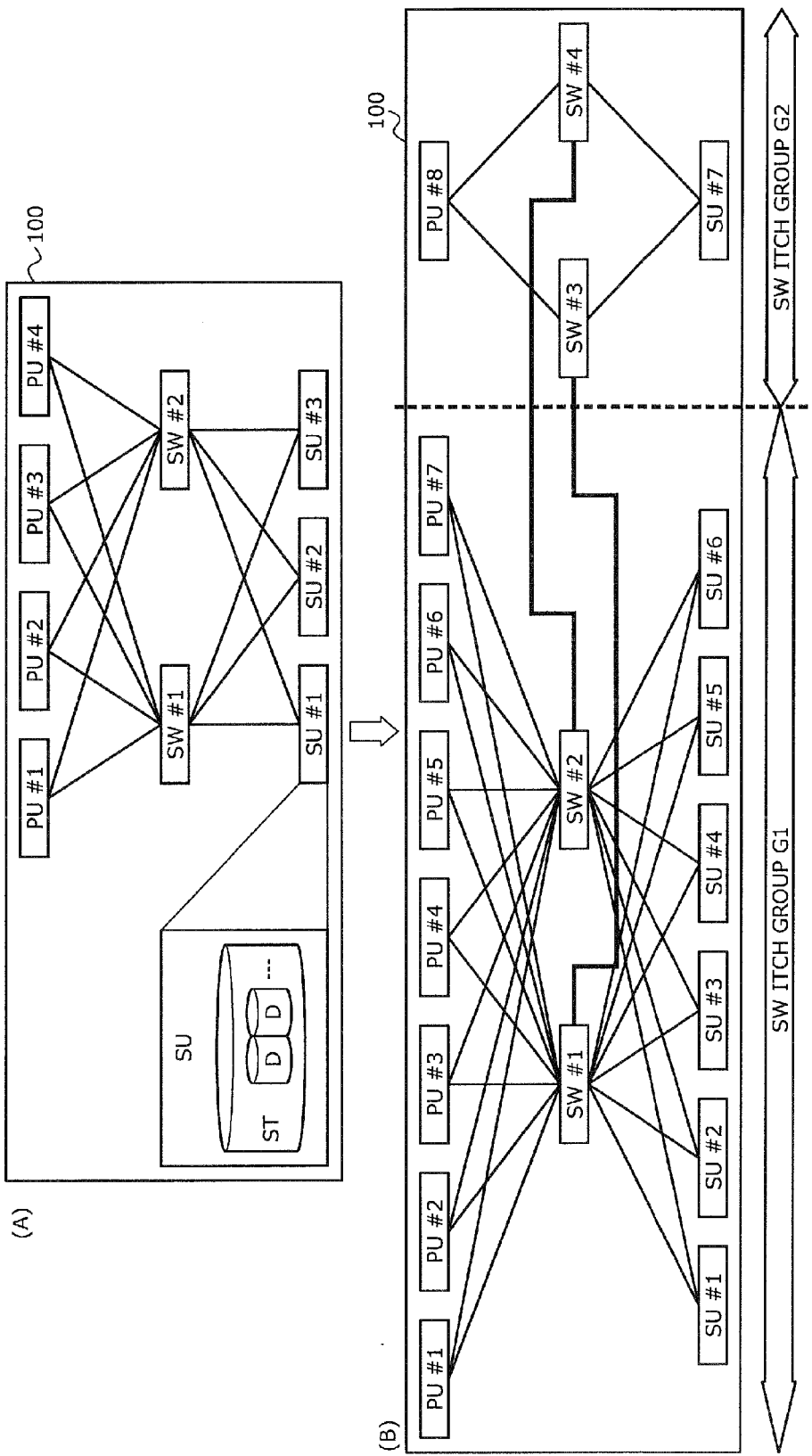
FIG. 1 is an explanatory view of an example of a control method according to an embodiment.

FIG. 1 is an explanatory view of an example of a control method according to an embodiment. In (A) of FIG. 1, a storage system 100 includes PUs #1 to #4, SUs #1 to #3, and SWs #1, #2. The PU #1 acts as a master control unit managing the other PUs (e.g., the PUs #2 to #4) in the storage system 100 to control the entire system. The PU #1 has a function of expanding the entire memory capacity of the storage system 100 by putting an SU into a usable state when the SU is added to the storage system 100.

The PUs #1 to #4 are computers controlling the SUs #1 to #3 under control thereof. The PUs #1 to #4 accept access to the SUs #1 to #3 under control thereof. When an added SU is connected and becomes accessible, the PUs #1 to #4 manage the SU as an SU under control thereof.

The SUs #1 to #3 are computers having respective storages (hereinafter referred to as "STs") and controlling access to the respective STs. Each of the STs includes one or more memory devices D. The memory device D may be, for example, a physical memory device such as a hard disk, an optical disk, flash memory, and a magnetic tape or may be a LUN that is a logical memory device.

The SWs #1, #2 are computers having a switching function. The SWs #1, #2 select a route (port) corresponding to a destination of received data to relay the data. In the storage system 100, the PUs #1 to #4 and the SUs #1 to #3 are connected in full mesh via the redundant SWs #1, #2 (see (A) of FIG. 1).

This enables all the PUs in the storage system 100 to access all the SUs and enables a fallback at the occurrence of a failure such as a failure of a PU. The fallback is to continue operation with performance or functions partially suspended when a failure occurs in a system.

The storage system 100 performs data access through wide striping, for example. The wide striping can suppress performance deterioration due to access concentration and secure stable performance without complicated performance design in consideration of the volume of access from a higher-level apparatus such as a server to the storage system 100 and the physical position of a volume.

As the memory capacity required for the storage system 100 increases, the storage system 100 can be expanded in the overall memory area of the storage system 100. For example, in the storage system 100, the overall memory area of the storage system 100 can be expanded by using a PU and an SU as a set.

In the following description, addition of an expansion set defined as a set of a PU and an SU to the storage system 100 may be referred to as "scale-out" and a pair of a PU and an SU may be referred to as a "node". However, in a basic configuration, it is assumed that the storage system 100 has two PUs connected to one SU for redundancy. Therefore, in the example of FIG. 1, the PU #1, #2 and the SU #1 make up one node (basic node).

Date stored after the scale-out may be stored in multiple SUs through the wide striping and the access performance of the multiple SUs can be expected. On the other hand, the number of ports included in each of the SWs is limited and the numbers of PUs and SUs connectable to each of the SWs have a limit. Therefore, if the SW ports run short in the storage system 100 due to repeated scale-out, an SW is added.

By way of example, it is assumed that an SW has 24 ports as defined in specification. Although two lines are depicted as routes connecting an SU and SWs in FIG. 1, it is assumed that an SU and an SW are physically connected through two cables. In this case, as the scale-out is progressively performed from the state depicted in (A) of FIG. 1, the ports of the SWs #1, #2 run short from a seven-node configuration and therefore, the SWs #3, #4 are added.

In this case, the SWs are cascade-connected in the storage system 100 to realize the full mesh connection of the PUs and the SUs. Cascade connection is to connect multiple SWs in series so that more devices (such as PUs and SUs) can be connected. In the example of (B) in FIG. 1, the SWs #1 and #3 are cascade-connected and the SWs #2 and #4 are cascade-connected. The two SWs #1, #2 are prepared for redundancy and the SWs #1 and #2 are not cascade-connected. The same applies to SWs #3, #4.

In this case, the access performance with respect to data stored before scale-out remains as the performance of the SUs before scale-out. It is not desirable that the access performances to data stored before and after scale-out are unbalanced, in terms of management of the performance of the storage system 100.

Therefore, to achieve optimization of the access performance with respect to data, it is contemplated to rearrange data among SUs at the time of scale-out depending on a degree of bias of data generated among the SUs of the storage system 100. However, if the data rearrangement is performed at the time of scale-out, data stored in existing SUs (e.g., the SUs #1 to #6) are distributed and arranged in an added SU (e.g., the SU #7).

In this arrangement state, for example, if data access is performed from the PU #1, data distributed to the SUs #1 to #7 must be accessed. However, to access the data on the SU #7, the route of cascade connection between SWs must be used. Since the bandwidth of this route is the same as the bandwidth of the route connecting a PU and an SU, if incoming/outgoing data transfer between SWs increases, the access performance to SUs deteriorates and optimization of access performance cannot be expected from distributed arrangement of data.

Therefore, in this embodiment, the PU #1 groups PUs and SUs directly connected to each SW and provides data rearrangement control in SUs belonging to each group (hereinafter referred to as a "switch group G"). In this case, the PU #1 controls path configuration such that an access route in the case of connection from a server etc., goes through a PU in the switch group G in which data is stored.

For example, in the example depicted in (B) of FIG. 1, the PU #1 groups the PUs #1 to #7 and the SUs #1 to #6 directly connected to the SW #1 (SW #2) as a switch group G1. The PU #1 groups the PU #8 and the SU #7 directly connected to the SW #3 (SW #4) as a switch group G2.

For the switch group G1, the PU #1 provides the data rearrangement control for the SUs #1 to #6 belonging to the switch group G1. For the switch group G2 the PU #1 provides the data rearrangement control for the SU #7 belonging to the switch group G2.

As a result, even if SWs are cascade-connected in association with the scale-out of the storage system 100, the cascade route between the SWs is no longer used at the time of data access and the access performance at the time of data access can be prevented from deteriorating.

The cascade connection of SWs can increase the availability of the storage system 100. For example, when the PU #8 is added, the PU #8 is included in a cluster of the existing PUs #1 to #7 to manage the PU #8 as a constituent element of the same cluster so that only the PU #1 can be defined as the master control unit managing the cluster.

For example, when an abnormality occurs in the PU #8, failover of the volume assigned to the PU #8 can be performed by another PU (e.g., the PUs #1 to #7). The failover is a function that, for example, if an abnormality occurs in a certain PU, another PU takes over a process and data in place of the abnormal PU.

For example, if a PU abnormality in the switch group G1 results in a situation in which access performance cannot be maintained or alternate PUs run out, the frame of the switch group G can be removed to utilize the PU #8 and the SU #7 in the switch group G2.

An example of a hardware configuration of the computers (herein, simply "PU #1, etc.") of the PUs #1 to #8, the SUs #1 to #7, and the SWs #1 to #4 depicted in FIG. 1 will be described.

Figure 2:
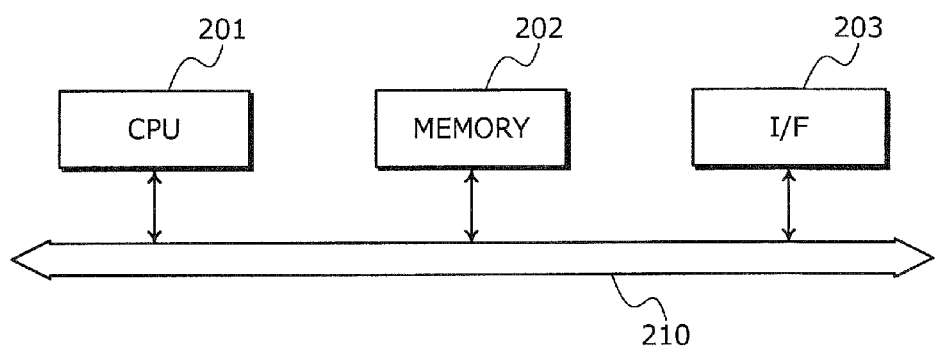
FIG. 2 is a block diagram of an example of a hardware configuration of a PU #1, etc.

FIG. 2 is a block diagram of an example of a hardware configuration of the PU #1, etc. In FIG. 2, PU #1, etc. includes a central processing unit (CPU) 201, memory 202, and an interface (I/F) 203, respectively connected by a bus 210.

The CPU 201 governs overall control of the PU #1, etc. The memory 202 includes, for example, read-only memory (ROM), random access memory (RAM), and flash ROM. More specifically, for example, the flash ROM stores programs such as an operating system (OS) and firmware; the ROM stores application programs; and the RAM is used as a work area of the CPU 201. Processes are executed by the CPU 201 by loading the programs stored in the memory 202 onto the CPU 201.

The I/F 203 controls the input and output of data with respect to other computers. The I/F 203 is connected to a network such as a local area network (LAN), a wide area network (WAN), and the Internet, via a communication line; and is connected to other computers through the network. The I/F 203 administers an internal interface with the network and controls the input and output of data with respect to other computers.

Description will be made of a functional configuration example of the PU #1 that is the master control unit in the storage system 100. In the storage system 100, if the PU #1 goes down, another PU (e.g., the PUs #2 to #8) takes over the function of the PU #1.

Figure 3:
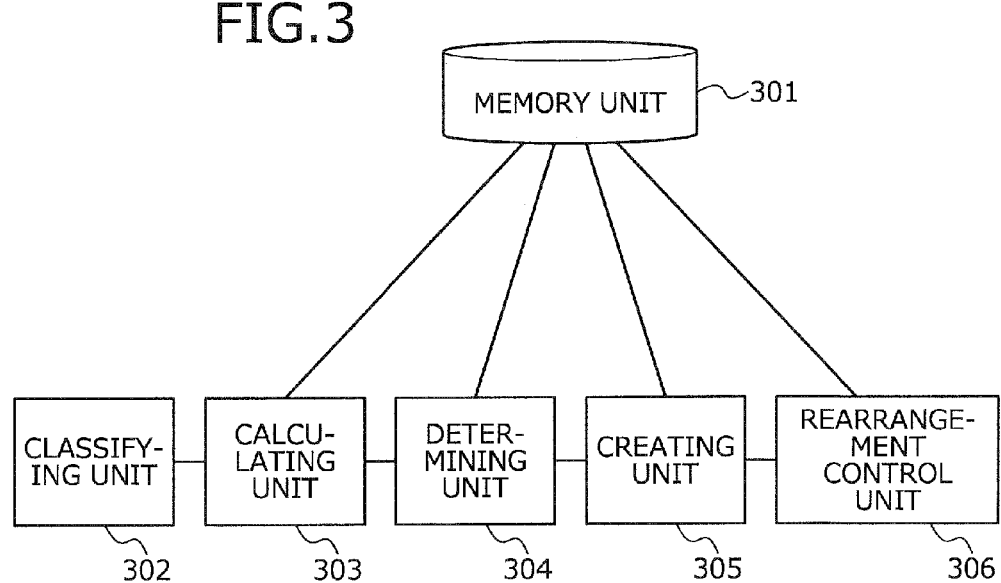
FIG. 3 is a block diagram of an example of a functional configuration of the PU #1.

FIG. 3 is a block diagram of an example of a functional configuration of the PU #1. In FIG. 3, the PU #1 includes a memory unit 301, a classifying unit 302, a calculating unit 303, a determining unit 304, a creating unit 305, and a rearrangement control unit 306. For example, the functions of the classifying unit 302 to the rearrangement control unit 306 are implemented by causing the CPU 201 to execute programs stored in the memory 202 depicted in FIG. 2 or by the I/F 203. The process results of the functional units are stored in the memory 202, for example.

The memory unit 301 stores assignment information including assignment states of memory areas of SUs in the storage system 100. For example, the assignment information is information that indicates to which memory device D in an SU, a volume created on a PU in the storage system 100 is assigned to.

In storage system 100, memory is managed in units of memory areas called volumes. For example, a volume may be a logical volume acquired by grouping multiple physical memory devices or partitions in a memory device (e.g., a hard disk) to virtually form one volume.

Although described later in detail with reference to FIG. 6, for example, the volume is an aggregate of multiple segment sets and each segment set is an aggregate of multiple segments. In this case, the assignment information is information that indicates which memory device D in an SU, each segment making up the volume is assigned to.

When a volume is created, the segments making up the volume are assigned to the memory devices D in any SUs belonging to the same switch group G. Therefore, in the storage system 100, a volume is created so as not to go beyond the switch group G.

For example, the assignment information is stored in the memory 202 of the SU #1. For example, the PU #1 reads and stores the assignment information from the memory 202 of the SU #1 into the memory unit 301. This assignment information is updated depending on the assignment state of the memory areas of the SUs in the storage system 100, for example.

The assignment information may be stored in the memory 202 of multiple SUs (e.g., the SUs #2 to #7) for redundancy. A specific example of the assignment information will be described later with reference to FIGS. 8 to 10. The memory unit 301 is implemented by the memory 202 of the PU #1, for example.

The classifying unit 302 groups PUs and SUs directly connected to an SW in the storage system 100. For example, the classifying unit 302 groups PUs and SUs directly connected to each SW in the storage system 100 in response to the scale-out of the storage system 100. A classification result of the classification is stored in an SW group management table 700 depicted in FIG. 7 described later, for example.

The calculating unit 303 calculates a difference d in memory capacity of assigned memory areas between the memory devices D included in the respective SUs belonging to a switch group G, based on the assignment information stored in the memory unit 301. In the following description, a memory capacity of an assigned memory area of the memory device D may be referred to as an "assignment quantity q".

For example, the calculating unit 303 calculates a maximum assignment quantity $q\_max$ of the memory device D having the largest assignment quantity q among the multiple memory devices D included in the SUs #1 to #6 belonging to the switch group G1 (see FIG. 1.). The calculating unit 303 calculates a minimum assignment quantity q_min of the memory device D having the smallest assignment quantity q among the multiple memory devices D included in the SUs #1 to #6 belonging to the switch group G1 (see FIG. 1.). The calculating unit 303 may calculate a difference d between the maximum assignment quantity q_max and the minimum assignment quantity q_min.

For example, the assignment quantity q of each of the memory devices D can be obtained from the number of segments of volumes assigned to each of the memory devices D. For example, if a capacity of a segment is 256 [MB] and the number of segments assigned to a certain memory device D is "2", the assignment quantity q of this memory device D is 512 [MB]. The segment is a memory area that is a unit of management prescribed by a predetermined capacity and is managed by positional information such as a record reproduction instruction address (logical block addressing (LBA)) from a host to a volume.

The determining unit 304 determines whether predetermined bias exists in the assignment states of the memory areas of the SUs belonging to the switch group G, based on the difference d calculated by the calculating unit 303. A state with predetermined bias is a state in which the assignment states of the memory areas is biased to the extent that rearrangement is desirable for the assigned memory areas (e.g., segments) in the SUs belonging to the switch group G.

For example, the determining unit 304 may determine that a given bias exists in the assignment states of the memory areas of the SUs belonging to the switch group G, if the difference d between the maximum assignment quantity q_max and the minimum assignment quantity q_min is greater than or equal to a predetermined proportion α of the maximum assignment quantity q_max. The determining unit 304 may also determine that a given bias exists in the assignment states of the memory areas of the SUs belonging to the switch group G, if the difference d between the calculated maximum assignment quantity q_max and minimum assignment quantity q_min is greater than or equal to a predetermined size β.

The determining unit 304 may determine that a given bias exists in the assignment states of the memory areas of the SUs belonging to the switch group G, if the difference d between the maximum assignment quantity q_max and the minimum assignment quantity q_min is greater than or equal to the predetermined proportion α of the maximum assignment quantity q_max and greater than or equal to the predetermined size β.

If an SU is added that has a memory capacity larger than existing SUs, a large number of segments may be distributed to the added SU. Therefore, the determining unit 304 uses assignment quantity comparison, i.e., absolute usage quantity, rather than a usage rate acquired from a usage quantity relative to usable memory capacity, to determine whether a given bias exists in the assignment states of the memory areas of the SUs.

Immediately after the addition of an SU while existing SUs are present in the switch group G, no memory area is assigned to the added SU and the assignment quantity of the added SU (memory capacity of the assigned memory area) is zero. Therefore, the determining unit 304 can easily detect the bias of the assignment quantity in the memory areas of the SUs belonging to the switch group G by detecting the difference d of the assignment quantity q.

For example, the determination process of the determining unit 304 may regularly be executed at preset time intervals or may be executed at arbitrary timing according to operational input by an administrator, etc. of the storage system 100. The proportion α and the size β are stored in the memory 202, for example. Specific values of the proportion α and the size β will be described later.

The creating unit 305 creates a rearrangement plan such that the assignment quantities q of the memory devices D are equalized among the SUs belonging to the switch group G, based on the assignment information stored in the memory unit 301. For example, the rearrangement plan represents to which memory device D of which SU, a segment making up a volume is rearranged. For example, the creating unit 305 creates a rearrangement plan such that the assignment quantities q are equalized among the memory devices D included in the SUs #1 to #6 belonging to the switch group G1.

The creating unit 305 may create a rearrangement plan such that copy processes for data migration due to rearrangement are reduced in the STs of the SUs belonging to the switch group G, based on the assignment information stored in the memory unit 301. The created rearrangement plan is stored in a rearrangement plan table 720 depicted in FIG. 7 described later.

The rearrangement control unit 306 provides rearrangement control of memory areas assigned in the SUs belonging to the switch group G, based on the assignment information stored in the memory unit 301. For example, the rearrangement control unit 306 provides the rearrangement control of memory areas assigned in the SUs belonging to the switch group G depending on a degree of bias of the assigned memory areas in the SUs belonging to the switch group G.

For example, the rearrangement control unit 306 controls the SUs #1 to #6 belonging to the switch group G1 to rearrange the arrangement of the assigned memory areas in the SUs #1 to #6, according to the switch group G1 rearrangement plan created by the creating unit 305.

For example, a rearrangement control process by the rearrangement control unit 306 is executed in response to determination of the presence of a given bias in the assignment states of the memory areas of the SUs belonging to the switch group G. For example, the rearrangement control process by the rearrangement control unit 306 may be executed in response to detection of the execution of scale-out of the storage system 100.

Immediately after scale-out associated with an increase of a switch group G, no memory area is assigned to an SU belonging to the new switch group G. Therefore, the rearrangement control unit 306 may not execute the rearrangement control process immediately after scale-out associated with an increase of a switch group G.

A storage control process procedure of the PU #1 will be described. The storage control process is executed, for example, if scale-out of the storage system 100 is performed and a switch group G is not increased by the scale-out. The storage control process is executed at arbitrary timing according to operational input by an administrator, etc. or on regular basis.

Figure 4:
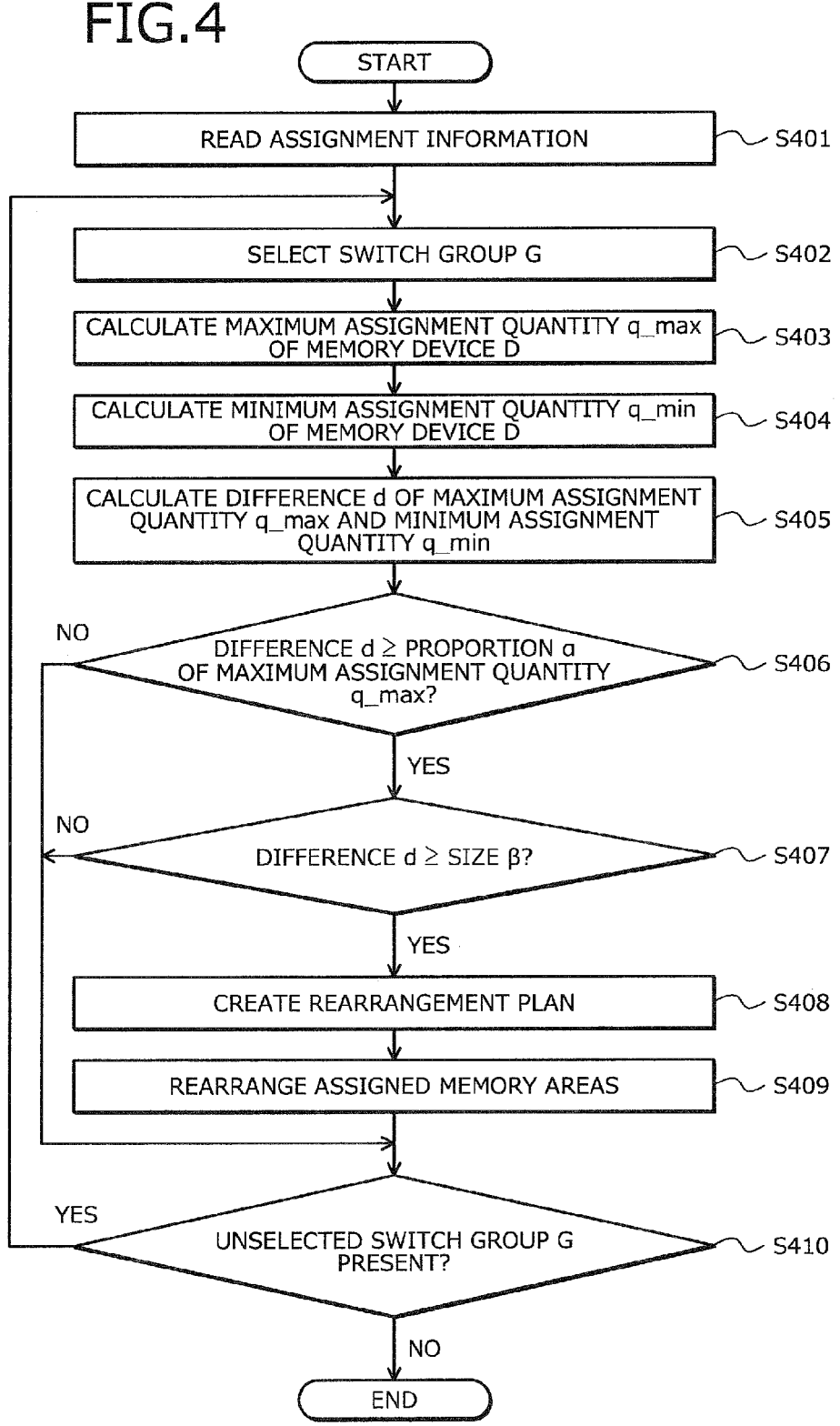
FIG. 4 is a flowchart of an example of a storage control process procedure of the PU #1.

FIG. 4 is a flowchart of an example of the storage control process procedure of the PU #1. In the flowchart of FIG. 4, the PU #1 reads the assignment information from the memory 202 of the SU #1 (step S401).

The PU #1 selects a switch group G in the storage system 100 (step S402). The PU #1 calculates the maximum assignment quantity q_max of the memory device D having the largest assignment quantity q among the multiple memory devices D included in the SUs belonging to the switch group G (step S403).

The PU #1 calculates the minimum assignment quantity $q\_min$ of the memory device D having the smallest assignment quantity q among the multiple memory devices D included in the SUs belonging to the switch group G (step S404). The PU #1 calculates the difference d of the calculated maximum assignment quantity $q\_max$ and minimum assignment quantity $q\_min$ (step S405).

The PU #1 determines if the calculated difference d is greater than or equal to the proportion α of the maximum assignment quantity $q\_max$ (step S406). If the difference d is less than the proportion α of the maximum assignment quantity $q\_max$ (step S406: NO), the PU #1 goes to step S410.

On the other hand, if the difference d is greater than or equal to the proportion α of the maximum assignment quantity $q\_max$ (step S406: YES), the PU #1 determines if the difference d is greater than or equal to the size β (step S407). If the difference d is less than the size β (step S407: NO), the PU #1 goes to step S410.

On the other hand, if the difference d is greater than or equal to the size β (step S407: YES), the PU #1 creates a rearrangement plan such that the assignment quantities q are equalized among the memory devices D included in the SUs belonging to the switch group G, based on the read assignment information (step S408). The PU #1 controls the SUs belonging to the switch group G to rearrange the assigned memory areas in the SUs belonging to the switch group G, according to the created rearrangement plan (step S409).

The PU #1 determines whether an unselected switch group G is present that has not been selected from the storage system 100 (step S410). If an unselected switch group G is present (step S410: YES), the PU #1 returns to step S402 to select an unselected switch group G in the storage system 100.

On the other hand, if no unselected switch group G is present (step S410: NO), the PU #1 terminates a series of operations of this flowchart.

As a result, the assignment states of the memory areas of the SUs belonging to the switch group G can be determined for each switch group G in the storage system 100 to provide the rearrangement control of the assigned memory areas in the SUs belonging to the switch group G.

As described above, the PU #1 according to the embodiment can group PUs and SUs directly coupled to each SW in the storage system 100 to provide the rearrangement control of memory areas assigned in the SUs belonging to each of the switch groups G. As a result, even if SWs are cascade-connected in association with scale-out of the storage system 100, the cascade route between the SWs is no longer used at the time of data access and the access performance at the time of data access can be prevented from deteriorating.

The PU #1 can provide the rearrangement control of memory areas assigned in the SUs belonging to each of the switch groups G depending on a degree of bias of the assigned memory areas in the SUs belonging to each of the switch groups G. As a result, optimization of access performance with respect to data distributed and arranged in the storage system 100 can be achieved.

The PU #1 can calculate the difference d between the maximum assignment quantity $q\_max$ of the memory devices D and the minimum assignment quantity $q\_min$ of the memory devices included in the SUs belonging to each of the switch groups G. The PU #1 can determine that a given bias exists in the assignment states of the memory areas of the SUs belonging to each of the switch groups G, if the calculated difference d is greater than or equal to the proportion α of the maximum assignment quantity $q\_max$ and greater than or equal to the size β. As a result, it can be determined whether the assignment states of the memory areas among STs is biased to the extent that rearrangement is desirable for the assigned memory areas in the SUs belonging to each of the switch groups G.

The PU #1 can provide the rearrangement control of the assigned memory areas in the SUs belonging to each of the switch groups G such that the assignment quantities q are equalized among the memory devices D included in the SUs belonging to each of the switch groups G. As a result, data can be distributed such that access to the data is equalized among the SUs belonging to each of the switch groups G.

An example of the storage system 100 according to the embodiment will be described.

Figure 5:
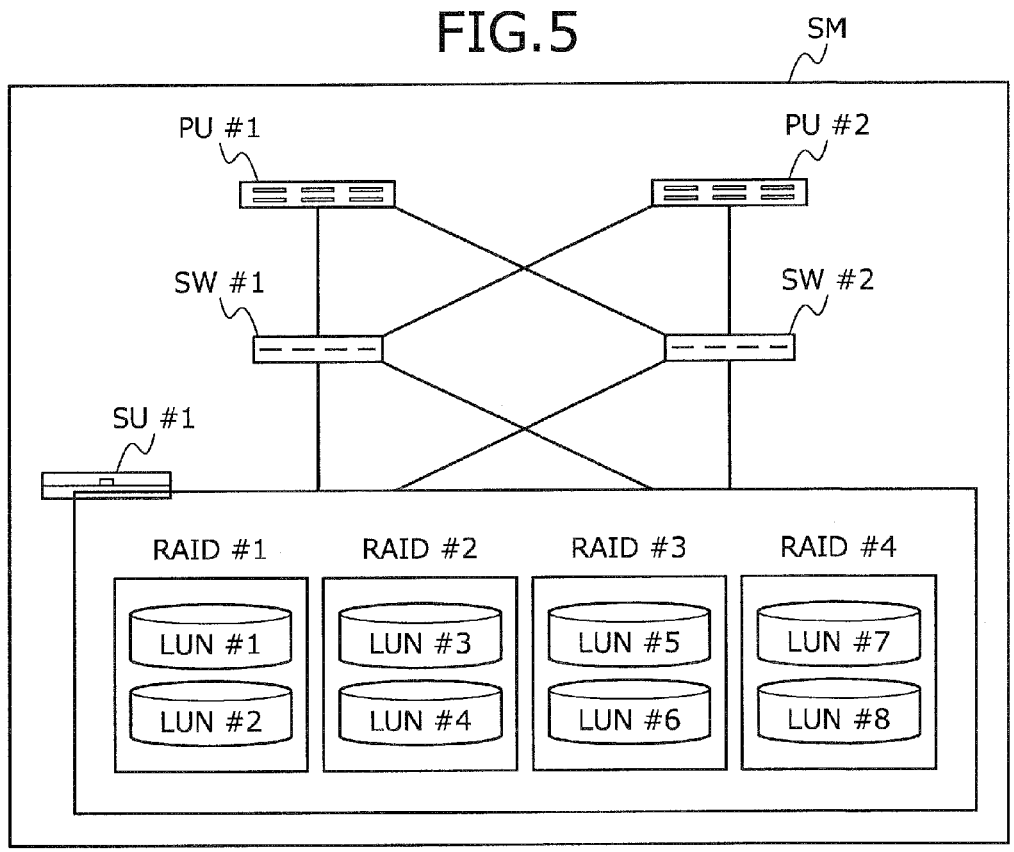
FIG. 5 is an explanatory view of a basic configuration example of a storage system 100 according to an example.

FIG. 5 is an explanatory view of a basic configuration example of the storage system 100 according to an example. In FIG. 5, the storage system 100 includes the PU #1, the PU #2, the SW #1, the SW #2, and the SU #1.

The PUs #1 and #2 control the SU #1. If a volume is created on the PUs #1 and #2, the PUs #1 and #2 assign the volume to a LUN of an SU (e.g., the SU #1) belonging to the switch group G1 to which the PUs #1 and #2 belong. The PUs #1 and #2 are servers accessible from a business server BS and a management server MS described later, for example. The SU #1 has redundant arrays of independent disks (RAIDs) #1 to #4 and controls access to the RAIDs #1 to #4.

Each of the RAIDs #1 to #4 is a RAID group obtained by gathering multiple memory devices (e.g., hard disks) to form one memory device. For example, each of the RAIDs #1 to #4 is made up of two LUNs. The STs depicted in FIG. 1 correspond to the RAIDs #1 to #4, for example, and the memory devices D depicted in FIG. 1 correspond to the LUNs, for example.

In the following description, the PUs #1, #2, and the SU #1 included in the storage system 100 may be referred to as a "basic node", and an expansion set added to the storage system 100 may be referred to as an "expansion node". A virtual volume provided by the storage system 100 may be referred to as a "VDISK".

Figure 6:
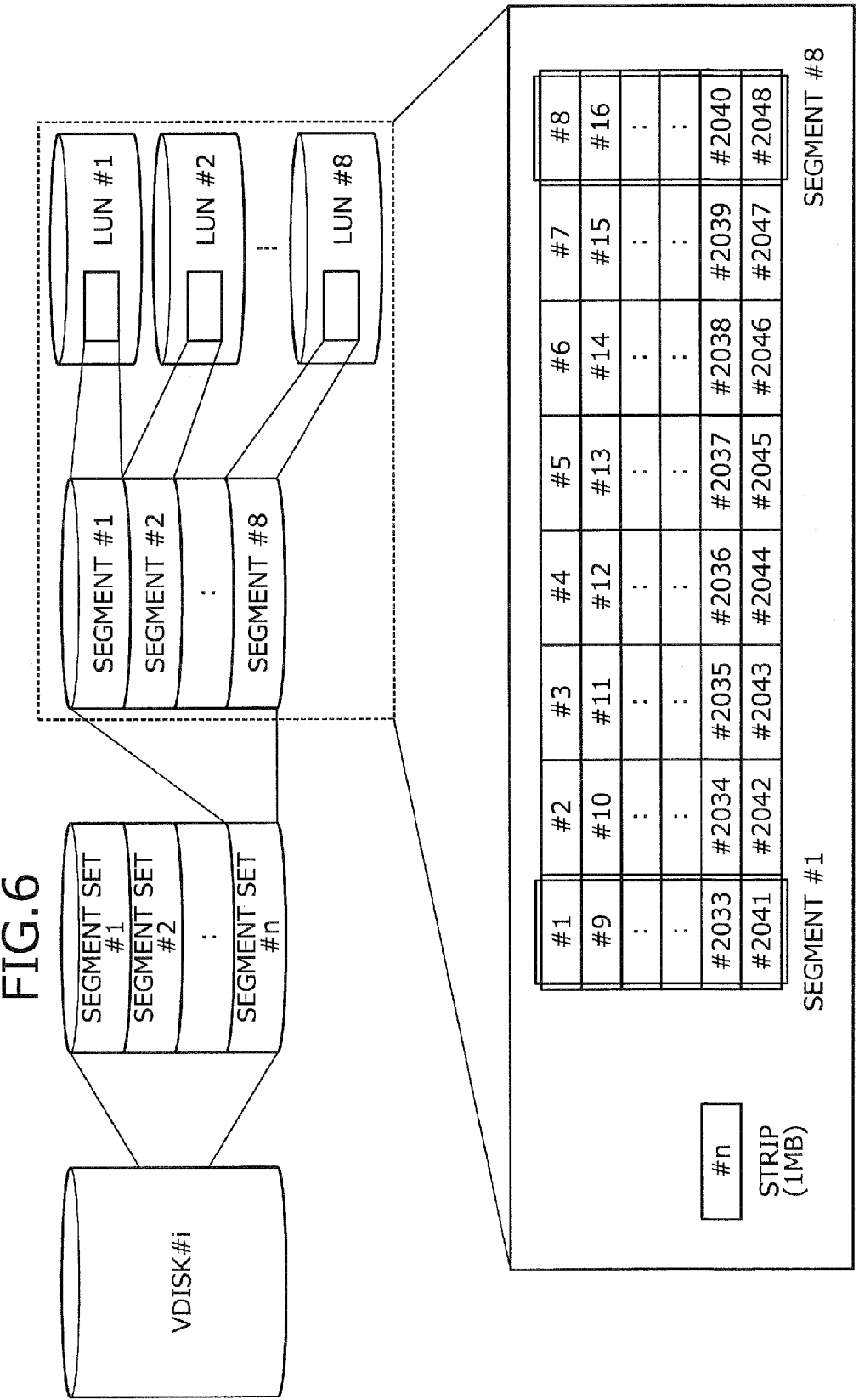
FIG. 6 is an explanatory view of a configuration example of a VDISK.

FIG. 6 is an explanatory view of a configuration example of a VDISK. In FIG. 6, a VDISK #i is an aggregate of segment sets #1 to #n (i: natural number, n: natural number not less than two). Each of the segment sets #1 to #n is an aggregate of eight segments #1 to #8. The capacity of each of the segment sets #1 to #n is 2 [GB], for example. The capacity of each of the segments #1 to #8 is 256 [MB], for example.

Taking the storage system 100 depicted in FIG. 5 as an example, the segments #1 to #8 are assigned to the respective LUNs #1 to #8 in the SU #1. User data is recorded in terms of a strip having a fixed length (1 [MB]). This strip is striped by sequentially utilizing the segments #1 to #8.

Figure 7:
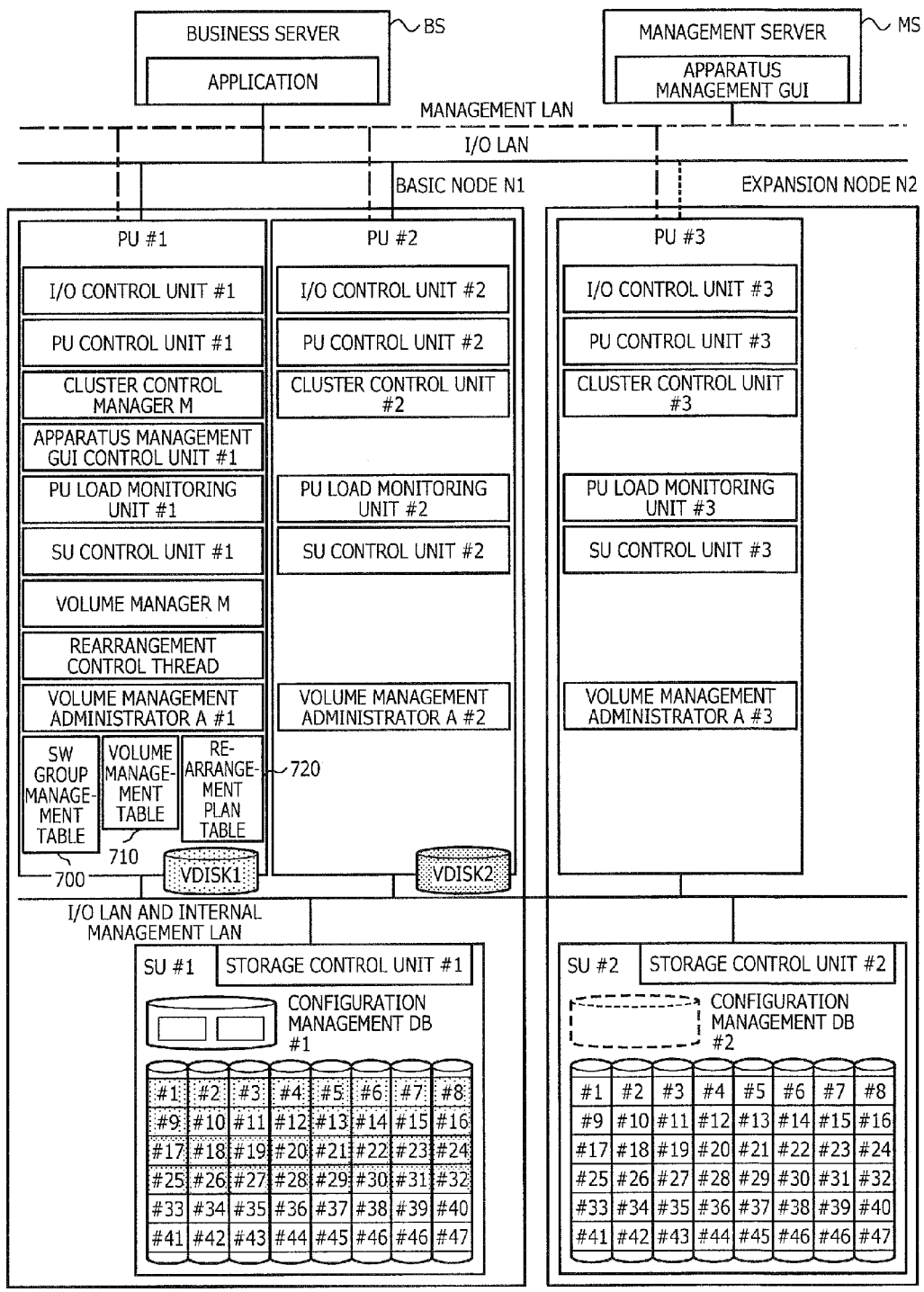
FIG. 7 is an explanatory view of a functional configuration example of a PU according to the example.

FIG. 7 is an explanatory view of a functional configuration example of a PU according to the example. In FIG. 7, the storage system 100 includes a basic node N1 and an expansion node N2. FIG. 7 depicts a state immediately after addition of the expansion node N2 to the storage system 100, i.e., a state of the storage system 100 immediately after scale-out. The basic node N1 includes the PU #1, the PU #2, and the SU #1. The expansion node N2 includes the PU #3 and the SU #2.

The PUs #1 and #2 of the basic node N1, the PU #3 of the expansion node N2, and the management server MS are connected via a management LAN. The management server MS is a computer used by an administrator of the storage system 100 and has an apparatus management graphical user interface (GUI).

The PUs #1 and #2 in the basic node N1, the PU #3 in the expansion node N2, and the business server BS are connected via an I/O LAN. The business server BS is a computer with business applications installed.

The PUs #1, #2, #3, the SUs #1, #2 are connected via the I/O LAN and an internal management LAN. The SUs #1, #2 have configuration management DBs #1, #2, and storage control units #1, #2. The storage control units #1, #2 are implemented by the execution of a storage control program on the CPU. The storage control program is a program controlling access to STs (storage) in the SUs #1, #2.

The configuration management DBs #1, #2 include a volume management table 710 and a rearrangement plan table 720. The volume management table 710 and the rearrangement plan table 720 are read out from the configuration management DB #1 (or the configuration management DB #2) and used by the PU #1.

The volume management table 710 includes a volume index table 1000 (see FIG. 10), a mirror volume index table 1100 (see FIG. 11), and a volume segment table 1200 (see FIG. 12). The assignment information described above corresponds to the volume management table 710, for example.

The volume index table 1000 is a table managing volumes (VDISKs). The mirror volume index table 1100 is a table managing mirror volumes. The volume segment table 1200 is a table managing segments of volumes. The tables 1000, 1100, and 1200 are correlated by using the volume number as an index.

The rearrangement plan table 720 is a table managing storage apparatuses (SUs), LUN numbers, and rearrangement statuses of planned arrangement destinations after planning where the segments making up a VDISK are arranged. The rearrangement status of a segment already rearranged (or without the need for rearrangement) is set to "rearrangement completed (or rearrangement not required)". The rearrangement status of a segment currently being rearranged is set to "under rearrangement", and the rearrangement status of a segment to be rearranged is set to "awaiting rearrangement".

During suspension of rearrangement, the PU #1 retains the rearrangement plan table 720 without deletion thereof. If the rearrangement is terminated, the PU #1 discards the rearrangement plan table 720. If a volume (VDISK) is deleted during the suspension of the rearrangement, the PU #1 deletes a corresponding record from the volume index table 1000 of the volume management table 710 and deletes a corresponding record from the rearrangement plan table 720. The volume management table 710 and the rearrangement plan table 720 will be described in detail with reference to FIGS. 10 to 14.

The PU #1 includes an I/O control unit #1, a PU control unit #1, a cluster control manager M, an apparatus management GUI control unit #1, a PU load monitoring unit #1, an SU control unit #1, a volume manager M, and a volume management administrator A #1. The PU #1 has the SW group management table 700, the volume management table 710, and the rearrangement plan table 720. The classifying unit 302, the calculating unit 303, the determining unit 304, the creating unit 305, and the rearrangement control unit 306 depicted in FIG. 3 correspond to the volume manager M, for example.

The PU #2 includes an I/O control unit #2, a PU control unit #2, a cluster control unit #2, a PU load monitoring unit #2, an SU control unit #2, and a volume management administrator A #2. The PU #3 includes an I/O control unit #3, a PU control unit #3, a cluster control unit #3, a PU load monitoring unit #3, an SU control unit #3, and a volume management administrator A #3.

The I/O control units #1 to #3 receive and process an I/O request from the business server BS. The PU control units #1 to #3 control the PUs #1 to #3. The cluster control manager M clusters PUs with each other. In this example, a cluster is formed by the PU #1, the PU #2, and the PU #3. The cluster control units #2 and #3 recognize the PUs #1 to #3 clustered by the cluster control manager M.

The apparatus management GUI control unit #1 determines the state of the storage system 100 and creates a new volume according to an instruction from the management server MS. The PU load monitoring units #1 to #3 monitor loads applied to the PUs #1 to #3. The SU control units #1 to #3 control the SUs #1, #2.

The volume manager M controls the volume management administrators A #1 to #3. For example, the volume manager M activates a rearrangement control thread and causes the volume management administrators A #1 to #3 to execute the thread. The volume management administrators A #1 to #3 manage volumes according to the control of the volume manager M.

If the PU #1 goes down in the storage system 100, for example, the PU #2 or the PU #3 takes over the function of the PU #1. For example, the hardware configurations of the business server BS and the management server MS are implemented by a CPU, memory, a magnetic disk drive, a magnetic disk, a display, an I/F, a keyboard, a mouse, etc.

The contents of the SW group management table 700 will be described.

Figure 8:
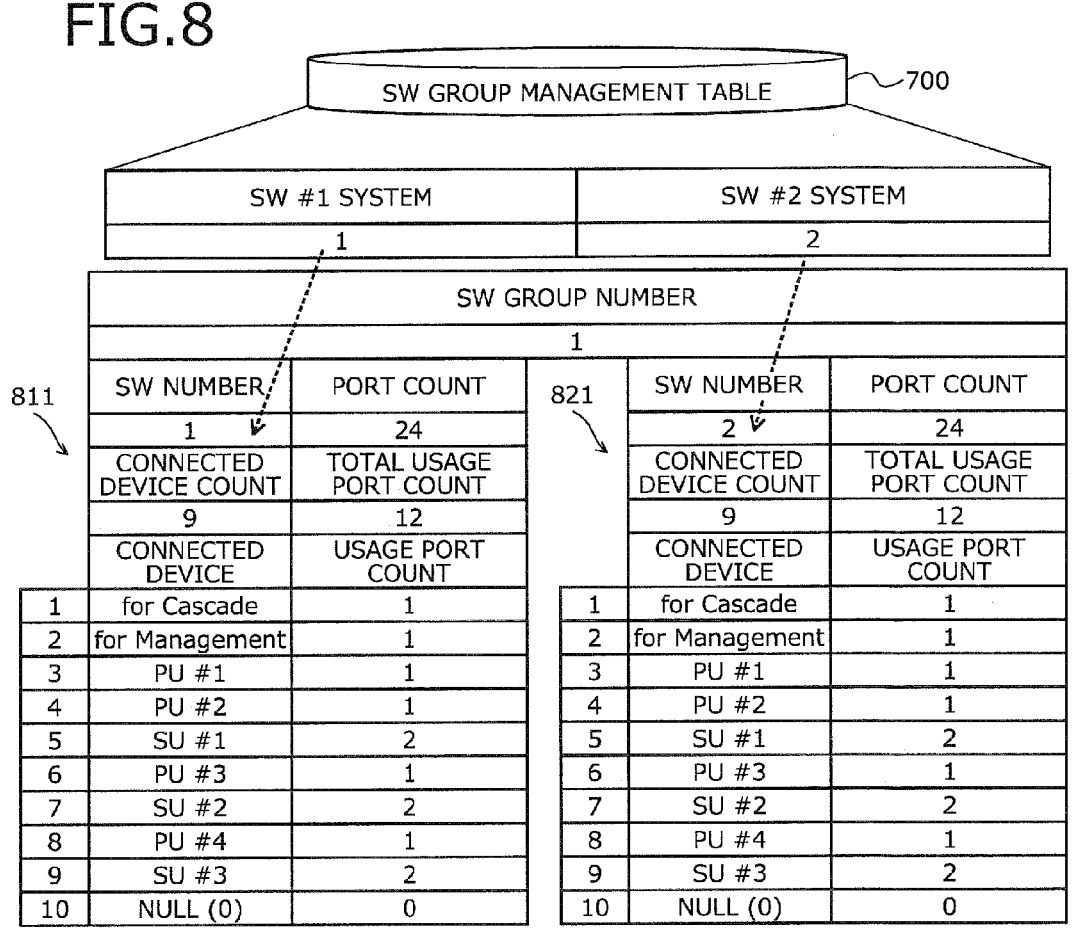
FIG. 8 is an explanatory view of an example of the contents of a SW group management table 700.

FIG. 8 is an explanatory view of an example of the contents of the SW group management table 700. In FIG. 8, the SW group management table 700 includes SW group management information (e.g., SW group management information 811) of an SW of an SW #1 system and SW group management information (e.g., SW group management information 821) of an SW of an SW #2 system.

The SW #1 system is an SW cascade-connected to the SW #1 and the SW #2 system is an SW cascade-connected to the SW #2. The contents of the SW group management table 700 depicted in FIG. 8 are the contents when the storage system 100 has a three-node configuration (the basic node N1: the PUs #1, #2 +the SU #1; the expansion node N2: the PU #3 +the SU #2; and the expansion node N3: the PU #4+the SU #3).

The SW group management information indicates an SW group number, an SW number, a port count, a connected device count, and a total usage port count. The SW group number is an identifier of a switch group G. The SW number is an identifier of an SW. The port count is the number of ports included in an SW. The connected device count is the number of devices (such as PUs and SUs) connected to an SW. The total usage port count is the total number of ports being used.

The SW group management information indicates connected devices and usage port counts in a correlated manner. The connected devices are devices connected to an SW. The usage port counts are the numbers of ports used for connection with the devices. Two ports of the ports included in an SW are reserved for cascade connection between SWs (for Cascade) and for SW management (for Management).

For example, the SW group management information 811 indicates the SW group number "1", the SW number "1", the port count "24", the connected device count "9", and the total usage port count "12" of the SW #1. For example, the SW group management information 811 also indicates the usage port count "1" of the connected device "PU #1" and the usage port count "2" of the connected device "SU #1". A connected device "NULL (0)" indicates the presence of an unused port.

An update example of the SW group management table 700 will be described. This update example of the SW group management table 700 will be described by taking a case of expanding the storage system 100 from a three-node configuration to a seven-node configuration as an example.

Figure 9:
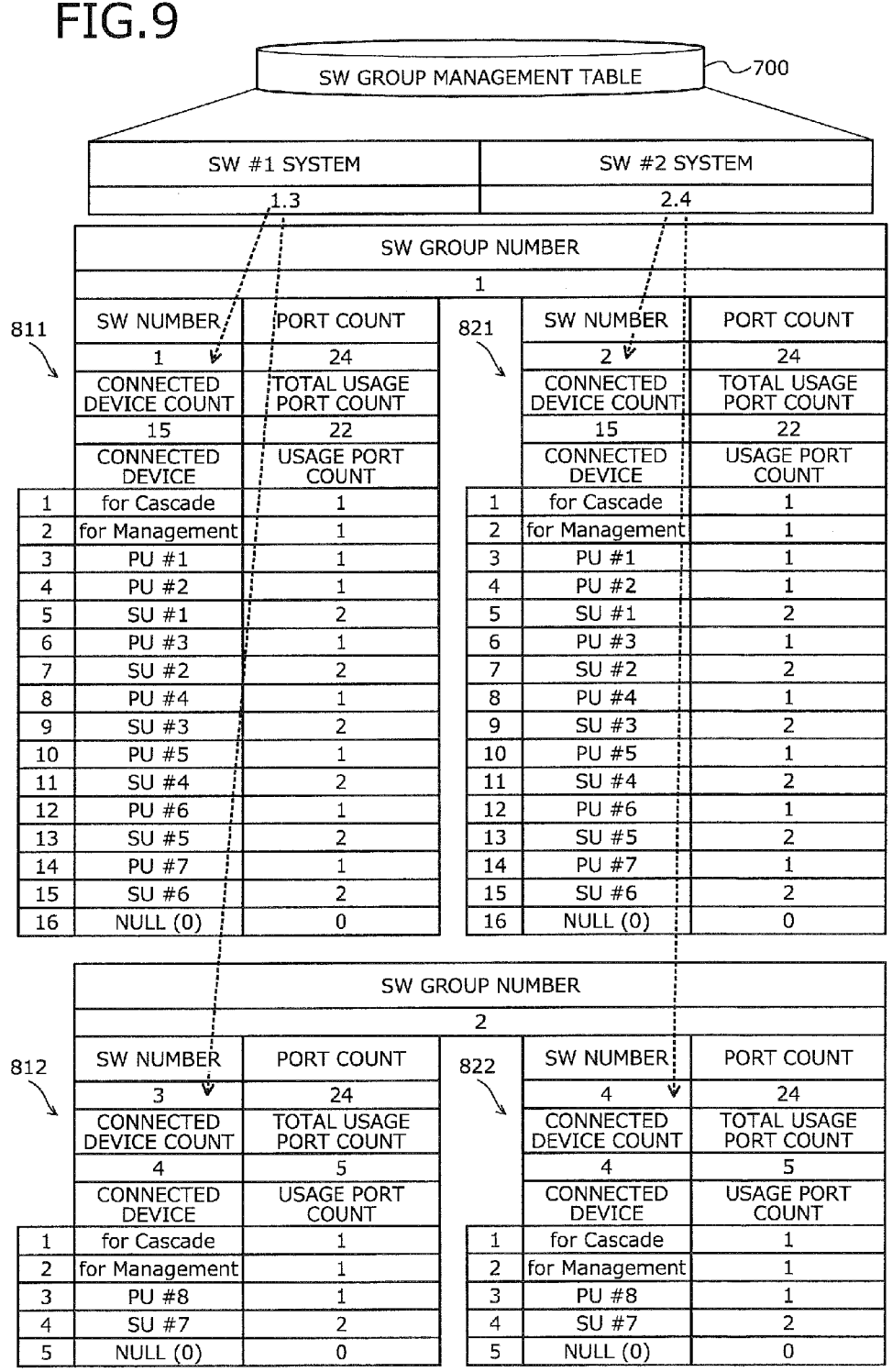
FIG. 9 is an explanatory view of an update example of the SW group management table 700.

FIG. 9 is an explanatory view of an update example of the SW group management table 700. In FIG. 9, the SW group management table 700 includes SW group management information 811, 812 of the SWs #1, #3 of the SW #1 system and SW group management information 821, 822 of the SWs #2, #4 of the SW #2 system.

In this case, since the SWs #1 and #2 have the port count "24" and the total usage port count is "22", a unit of expansion, i.e., "the number of ports of PU×1+SU×1=3" cannot be accommodated. Therefore, the SWs #3, #4 are added into the storage system 100, and the SW group management information 812, 822 of the SWs #3, #4 is newly created in the SW group management table 700.

For example, the SW group management information 812 indicates the SW group number "2", the SW number "3", the port count "24", the connected device count "4", and the total usage port count "5" of the SW #3. For example, the SW group management information 812 also indicates the usage port count "1" of the connected device "PU #8" and the usage port count "2" of the connected device "SU #7".

The contents of the volume management table 710 will be described.

FIG. 10 is an explanatory view of an example of the contents of the volume index table 1000. In FIG. 10, the volume index table 1000 has fields for a volume number, a volume name, an operating PU number, a volume attribute, a volume size, a volume state, and a rearrangement status. By setting information in the fields, volume information 1000-1 to 1000-n is stored as records.

The volume number is an identifier of a VDISK. The volume name is the name of the VDISK. The operating PU number is the identifier of the PU in which the VDISK is operating. The volume attribute is an attribute of the VDISK. The volume size is the size (GB) of the VDISK recognized by the business server BS. The volume state indicates whether the VDISK is accessible. The rearrangement status is the rearrangement status of the VDISK.

For example, the volume information 1000-1 indicates the volume name "Vdisk1", the operating PU number "1", the volume attribute "thin provisioning volume", the volume size "500", the volume state "normal", and the rearrangement status "under rearrangement" of a VDISK 1. The volume information with the volume name of "NULL(0)" as in the volume information 1000-n is information of an unprepared VDISK.

FIG. 11 is an explanatory view of an example of the contents of the mirror volume index table 1100. In FIG. 11, the mirror volume index table 1100 has fields for a volume number, a mirror count, a mirror volume number 1, and a mirror volume number 2. By setting information in the fields, mirror volume information (e.g., mirror volume information 1100-1, 1100-2) is stored as records.

The volume number is an identifier of a mirror volume. The mirror count is the number of mirrored volumes for mirroring. The mirror volume numbers 1, 2 are identifiers of VDISKs that are entities of mirror volumes. For example, the mirror volume information 1100-1 indicates the mirror count "2", the mirror volume number 1 "127", and the mirror volume number 2 "128" of a VDISK 2.

FIG. 12 is an explanatory view of an example of the contents of the volume segment table 1200. The example depicted in FIG. 12 is an example of the contents of the volume segment table 1200 when a volume (volume number 701) is created after a seventh expansion node (the PU #8+the SU #7) is added to the storage system 100.

In FIG. 12, the volume segment table 1200 has fields for a volume number, a segment set number, a segment number, an SW group number, a storage apparatus, a LUN number, and a segment state. By setting information in the fields, segment information (e.g., segment information 1200-1, 1200-2) is stored as records.

The volume number is the identifier of a VDISK. The segment set number is the identifier of a segment set making up the VDISK. The segment number is the identifier of a segment making up the segment set. The SW group number is the identifier of the switch group G to which the segment belongs.

The storage apparatus is the identifier of the SU to which the segment belongs. The LUN number is the identifier of the LUN to which the segment is assigned. The segment state indicates whether the segment is accessible. For example, the segment information 1200-1 indicates the SW group number "1", the storage apparatus "1", the LUN number "1", and the segment state "enabled" of a segment 1 of a segment set 1 of the VDISK 1.

The contents of the rearrangement plan table 720 will be described.

Figure 13:
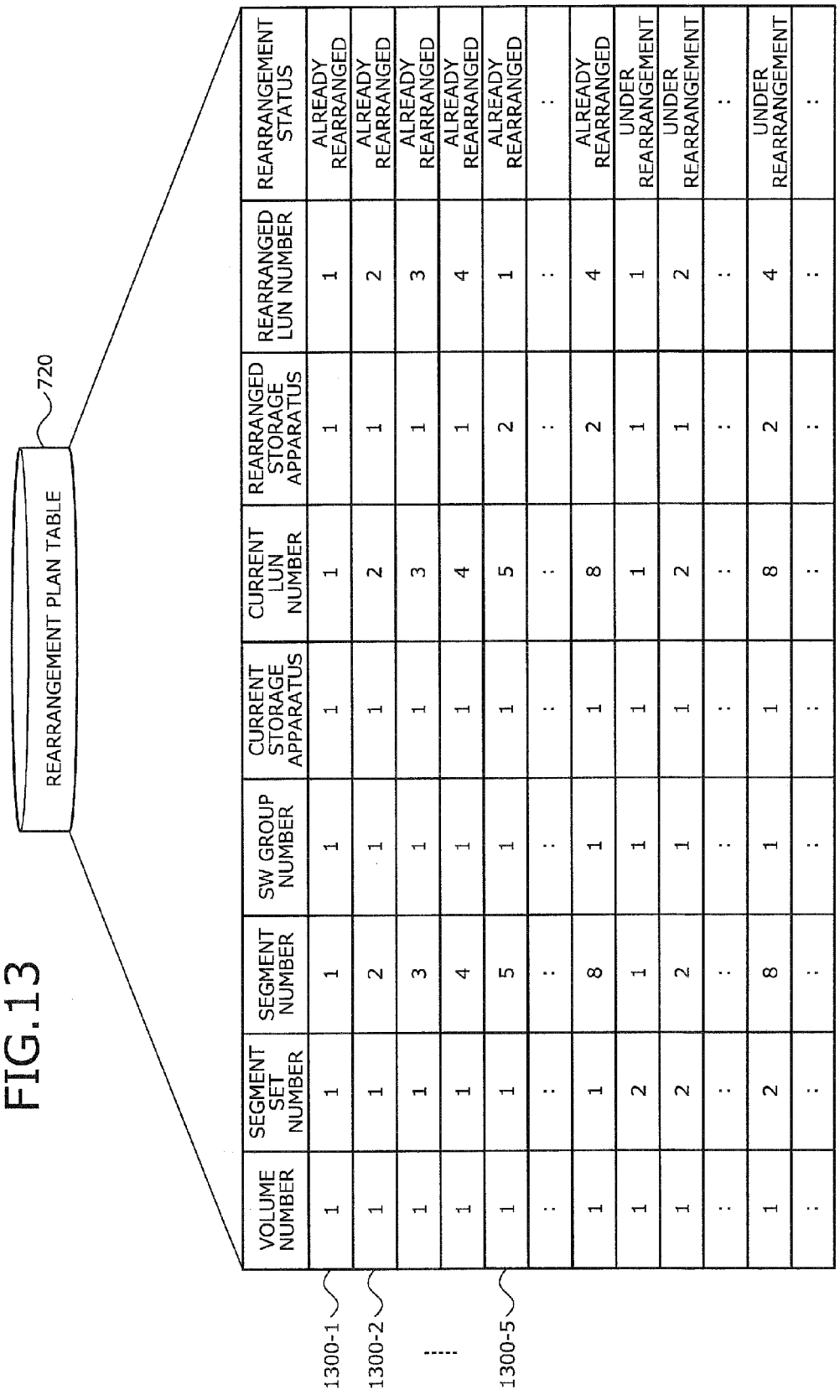
FIG. 13 is an explanatory view (part one) of an example of the contents of a rearrangement plan table 720.

FIG. 13 is an explanatory view (part one) of an example of the contents of the rearrangement plan table 720. The example depicted in FIG. 13 is an example of the contents of the rearrangement plan table 720 when the expansion nodes up to a sixth node are added to the storage system 100.

In FIG. 13, the rearrangement plan table 720 has fields for a volume number, a segment set number, a segment number, an SW group number, a current storage apparatus, a current LUN number, a rearranged storage apparatus, a rearranged LUN number, and a rearrangement status. By setting information in the fields, rearrangement plan information (e.g., rearrangement plan information 1300-1 to 1300-5) is stored as records.

The volume number is the identifier of a VDISK. The segment set number is the identifier of a segment set making up the VDISK. The segment number is the identifier of a segment making up the segment set. The SW group number is the identifier of a switch group G to which the segment belongs.

The current storage apparatus is the identifier of the SU to which the segment before rearrangement belongs. The current LUN number is the identifier of the LUN to which the segment before rearrangement is assigned. The rearranged storage apparatus is the identifier of the SU to which the segment after rearrangement belongs. The rearranged LUN number is the identifier of the LUN to which the segment after rearrangement is assigned. The rearrangement status indicates the rearrangement status of the segment.

For example, the rearrangement plan information 1300-1 indicates the SW group number "1", the current storage apparatus "1", the current LUN number "1", the rearranged storage apparatus "1", the rearranged LUN number "1", and the rearrangement status "already rearranged" of the segment 1 of the segment set 1 of the VDISK 1.

FIG. 14 is an explanatory view (part two) of an example of the contents of the rearrangement plan table 720. The example depicted in FIG. 14 is an example of the contents of the rearrangement plan table 720 when a volume (volume number 701) is created after a seventh expansion node (the PU #8+the SU #7) is added to the storage system 100 and an eighth expansion node (the PU #9+the SU #8) is subsequently added to the storage system 100.

In FIG. 14, the rearrangement plan table 720 stores rearrangement plan information (e.g., rearrangement plan information 1400-1 to 1400-4) of the segments belonging to the switch group G2. For example, the rearrangement plan information 1400-1 indicates the SW group number "2", the current storage apparatus "7", the current LUN number "1", the rearranged storage apparatus "7", the rearranged LUN number "1", and the rearrangement status "rearrangement not required" of the segment 1 of the segment set 1 of a VDISK 701.

The rearrangement plan information 1400-2 indicates the SW group number "2", the current storage apparatus "7", the current LUN number "2", the rearranged storage apparatus "8", the rearranged LUN number "1", and the rearrangement status "under rearrangement" of the segment 2 of the segment set 1 of the VDISK 701.

Description will be made of a determination example of bias of the assignment quantities q of segments of the LUNs included in SUs belonging to a switch group G. The PU #1 monitors the assignment quantities q of segments of the LUNs belonging to the switch group G and, if it is detected that "bias exists", the PU #1 uses the apparatus management GUI control unit to give notification of the occurrence of bias. Monitoring is triggered, for example, when system configuration changes consequent to the addition of a node, when regular monitoring time comes, or when the amount of load of an SU increases.

For example, the PU #1 refers to the SW group management table 700 to identify the SUs belonging to the switch groups G. In the case of the SW group management table 700 depicted in FIG. 9 as an example, the PU #1 identifies the SUs #1 to #6 belonging to the switch group G1. The PU #1 identifies the SU #7 belonging to the switch group G2.

The PU #1 then refers to the volume management table 710 to calculate the assignment quantities q of segments of the LUNs belonging to the switch groups G for each switch group G. The PU #1 identifies for each switch group G, the maximum assignment quantity $q\_max$ of the LUN having the largest assignment quantity q of segments and the minimum assignment quantity $q\_min$ of the LUN having the smallest assignment quantity q of segments among all the LUNs belonging to the switch group G.

The PU #1 determines if the difference d between the maximum assignment quantity $q\_max$ and the minimum assignment quantity $q\_min$ is greater than or equal to the proportion a of the maximum assignment quantity $q\_max$ and if the difference d is greater than or equal to the size β for each switch group G. If the difference d is greater than or equal to the proportion α of the maximum assignment quantity $q\_max$ and greater than or equal to the size β, the PU #1 determines that bias exists in the assignment quantities q of segments of the LUNs belonging to the switch group G.

The proportion α and the size β can be set arbitrarily. For example, the proportion α is set to a value of about 5 to 10 [%]. For example, the size β is set to a value of about 64 [GB] or 128 [GB].

A rearrangement plan of volumes (VDISKs) will be described. The PU #1 develops a rearrangement plan from the assignment quantities q of segments of the LUNs making up SUs. Therefore, balanced rearrangement can be performed even if the load capacity of an SU to be added is different from the load capacity of an existing SU.

FIG. 15 is an explanatory view of an example of a volume rearrangement plan. As depicted for Item 1 in FIG. 15, it is assumed that an expansion set (SU #2) of 8.4 [TB] is added to a basic set (SU #1) of 8.4 [TB] in the switch group G1. In this case, the PU #1 achieves distributed arrangement such that the assignment quantities q of segments of the LUNs are equalized between the SU #1 and the SU #2.

As depicted for Item 2 in FIG. 15, it is assumed that an expansion set (SU #2) of 16.8 [TB] is added to a basic set (SU #1) of 8.4 [TB] in the switch group G1. In this case, the PU #1 achieves distributed arrangement such that the assignment quantities q of segments of the LUNs are equalized between the SU #1 and the SU #2.

As depicted for Item 3 in FIG. 15, it is assumed that an expansion set (SU #3) of 16.8 [TB] is added to a basic set (SU #1) of 8.4 [TB] and an expansion set (SU #2) of 8.4 [TB] in the switch group G1. In this case, the PU #1 achieves distributed arrangement such that the assignment quantities q of segments of the LUNs are equalized among the SU #1, the SU #2, and the SU #3.

With reference to FIG. 16, description will be made of how existing volumes in a switch group G are rearranged for the SU #2 added by scale-out. Although a case of automatically activating the rearrangement process after the scale-out will be described, a rearrangement instruction can be made manually from a GUI screen of the management server MS.

FIG. 16 is an explanatory view (part one) of a rearrangement example of volumes. In FIG. 16, segments A0 to A31 making up a volume 1 and segments B0 to B15 making up a volume 2 are arranged in the SU #1 (in FIG. 16, before rearrangement). In FIG. 16, columns in the SUs #1, #2 represent LUNs in the SUs #1, #2.

First, the PU #1 creates the rearrangement plan table 720 such that the assignment quantities q of segments of the LUNs are equalized between the SU #1 and the SU #2 (in FIG. 16, rearrangement draft). The arrangement positions of the segments are provisional.

The PU #1 refers to the rearrangement plan table 720 to rearrange the segments A0 to A31 of the volume 1. In this example, the segments A8 to A15 and A24 to A31 of the volume 1 are rearranged in the SU #2 (in FIG. 16, under rearrangement).

The PU #1 refers to the rearrangement plan table 720 to rearrange the segments B0 to B15 of the volume 2. In this example, the segments B8 to B15 of the volume 2 are rearranged in the SU #2 (in FIG. 16, after rearrangement). As a result, the SU #1 and the SU #2 are equalized in terms of physical capacity.

Although the usage status of the LUNs appears discontinuous, if the volumes are made up of wide-striped segments, no problem occurs in terms of performance. In other words, the discontinuity of the usage status of the LUNs has no effect on performance. Therefore, in the sense of avoiding unnecessary migration processing, the segments A16 to A23 and the segments B0 to B7 should not be migrated so that wasteful processing can be reduced for the apparatus.

The storage system 100 has rearrangement process suspension and resume functions for a case when it is desired to temporarily stop the rearrangement process because of maintenance, inspection, etc. of the PUs and SUs. The storage system 100 has a rearrangement process termination function. However, if a rearrangement process is terminated, the planned rearrangement plan is discarded and when the rearrangement is performed again, processes are re-executed to determine bias of the assignment quantities q of segments of the LUNs in the storage system 100 as well as to create a new rearrangement plan table.

On the other hand, if the suspension function is utilized, the PU #1 retains the rearrangement plan developed for rearrangement of volumes during suspension of the rearrangement without discarding the plan. Upon receiving a resume instruction, the PU #1 refers to the volume management table 710 and the rearrangement plan table 720 and continues the rearrangement process from an entry to be resumed. This enables suspension during rearrangement and resumption from suspension.

An update example of the volume index table 1000 will be described.

FIG. 17 is an explanatory view of an arrangement example of volumes. In FIG. 17, the segments #1 to #16 making up the VDISK 1 are disposed in the SU #1. The expansion node N2 having a set of the PU #3 and the SU #2 is added to the basic node N1. In this case, bias occurs in the assignment quantities q of segments of the LUNs included in the SUs #1, #2 belonging to the switch group G1 and therefore, the rearrangement process of the VDISK 1 is executed.

FIG. 18 is an explanatory view of an update example of the volume index table 1000. In FIG. 18, if the expansion node N2 is added to the basic node N1, the rearrangement status of volume information 1800-1 in the volume index table 1000 is updated from "awaiting rearrangement" to "under rearrangement".

Figure 19:
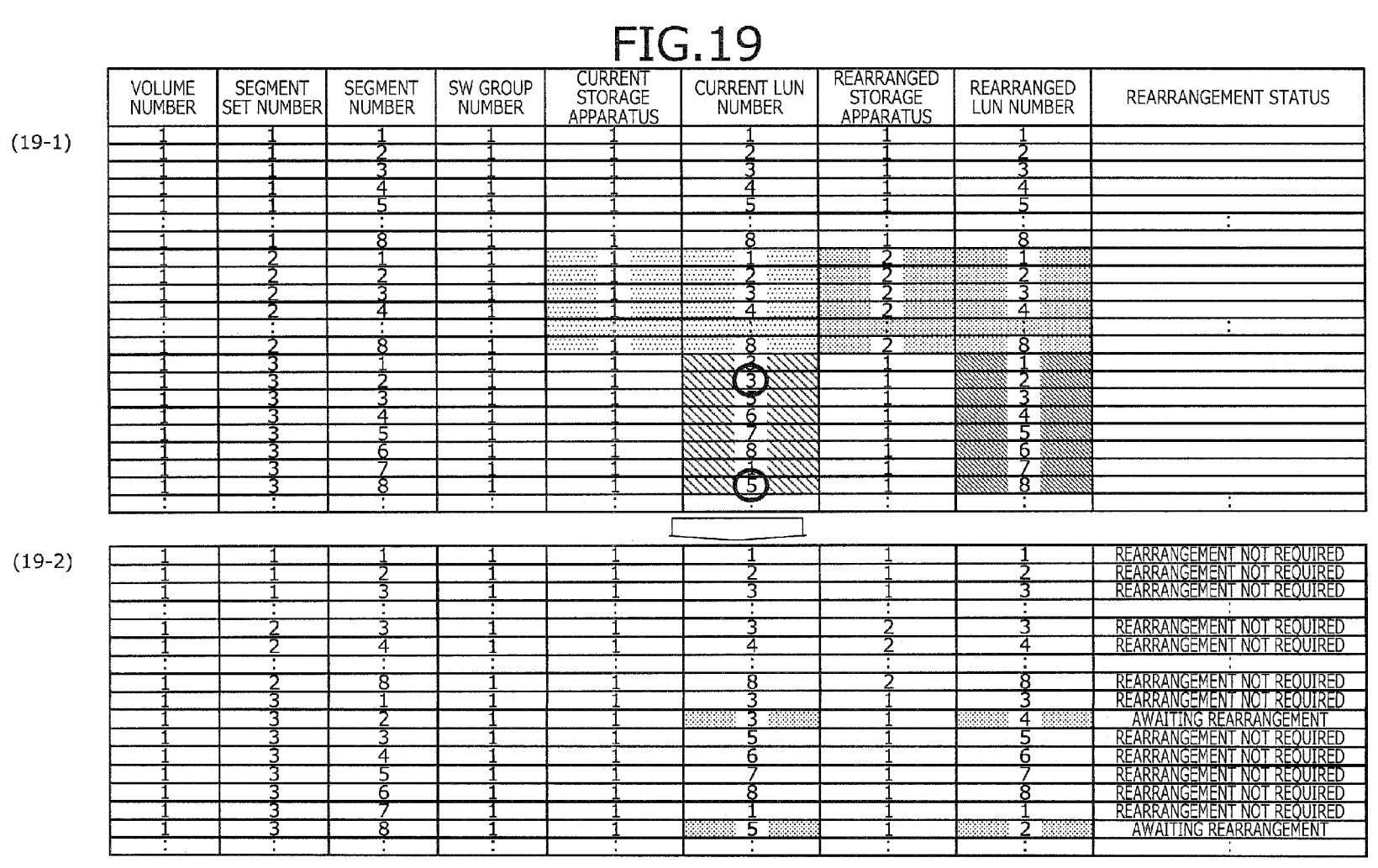

FIG. 19 is an explanatory view of an update example of the rearrangement plan table 720. In (19-1) of FIG. 19, the PU #1 performs assignment on the basis of a segment set of the VDISK 1, to all the SUs belonging to the switch group G and assigns the segments. The PU #1 also plans the assignment in terms of the LUN numbers such that consecutive LUNs are utilized. For example, the PU #1 develops a plan such that even segments are assigned to consecutive LUNs of the SU #2. The PU #1 develops a plan such that odd segments are assigned to consecutive LUNs of the SU #1.

In (19-2) of FIG. 19, after mechanically developing the rearrangement plan as described above, the PU #1 revises the rearrangement plan such that copy processes for data migration due to the rearrangement are reduced. For example, the PU #1 compares for each segment set, the current state (current storage apparatuses and current LUN numbers) with the state after rearrangement (rearranged storage apparatuses and rearranged LUN numbers).

For example, with regard to the segment set number 3, none the current LUN numbers are identical to the rearranged LUN numbers and, with regard the current LUN numbers, the segments are assigned to different LUNs with the exception of two segments that are assigned to the same LUN numbers. Therefore, the PU #1 revises the plan such that only the two segments assigned to the same LUNs are assigned to other LUNs (it is determined that although the LUN numbers are not in order of segment, the performance is not affected if the segments are assigned to different LUNs).

For the segments that are to be rearranged, the PU #1 sets the rearrangement status to "awaiting rearrangement". For the segments without the need for rearrangement, the PU #1 sets the rearrangement status of the rearrangement plan table 720 to "rearrangement not required".

A rearrangement plan for reducing copy processes for segment migration due to rearrangement in the same SU will be described. For example, a rearrangement plan in the same SU is created after the development of a rearrangement plan between SUs for equalizing the assignment quantities q of segments of the LUNs between SUs.

Figure 20:
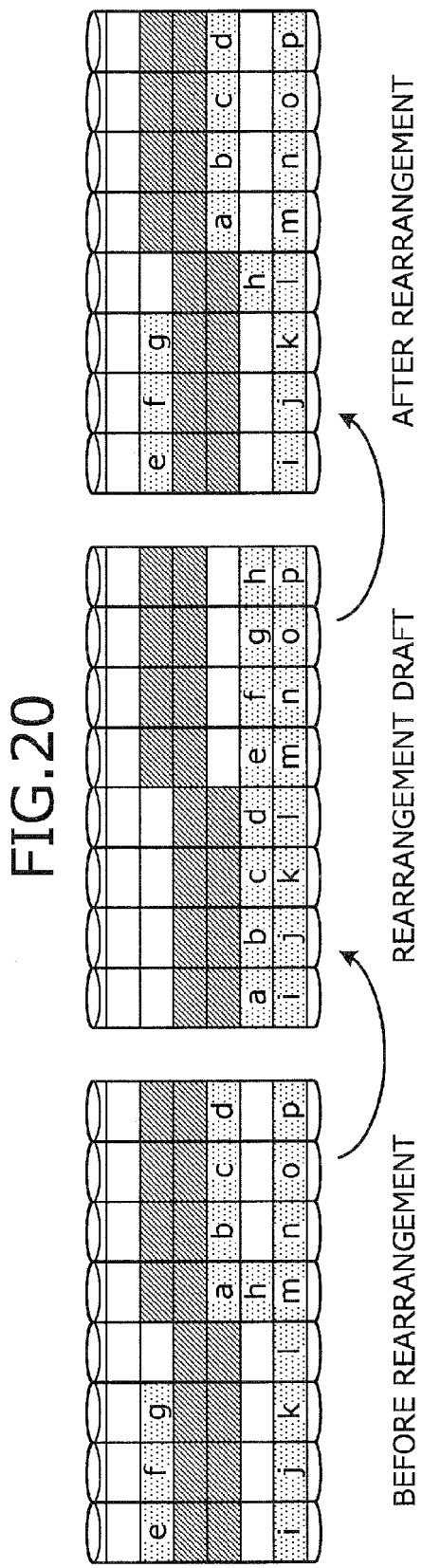
FIG. 20 is an explanatory view (part two) of a rearrangement example of volumes.

FIG. 20 is an explanatory view (part two) of a rearrangement example of volumes. In FIG. 20, it is assumed that a segment set made up of segments a to p is disposed in a given SU as depicted in "before rearrangement". In this case, for example, the PU #1 can arrange the segments a to h in sequence by utilizing unused areas of segments (in FIG. 20, white rectangles) and segments becoming available after segment migration. Black rectangles in FIG. 20 are areas of segments being used.

However, since the segments a to d and the segments e to g are already arranged in RAID groups different from each other, sufficient improvement can be made in terms of IO access performance by migrating only the segment h to another RAID group. Therefore, the PU #1 develops the rearrangement plan such that only the segment h is migrated.

As a result, as depicted in "after rearrangement", only the segment h is migrated to another LUN to equalize the segments among the LUNs. As described above, by developing the rearrangement plan such that copy processes for data migration due to the rearrangement are reduced in the same SU, the access performance can be improved while extra segment migration is suppressed. Accesses between PUs and SUs can also be reduced for rearrangement.

Data rearrangement at the time of addition of SUs to the storage system 100 will be described.

Figure 22:
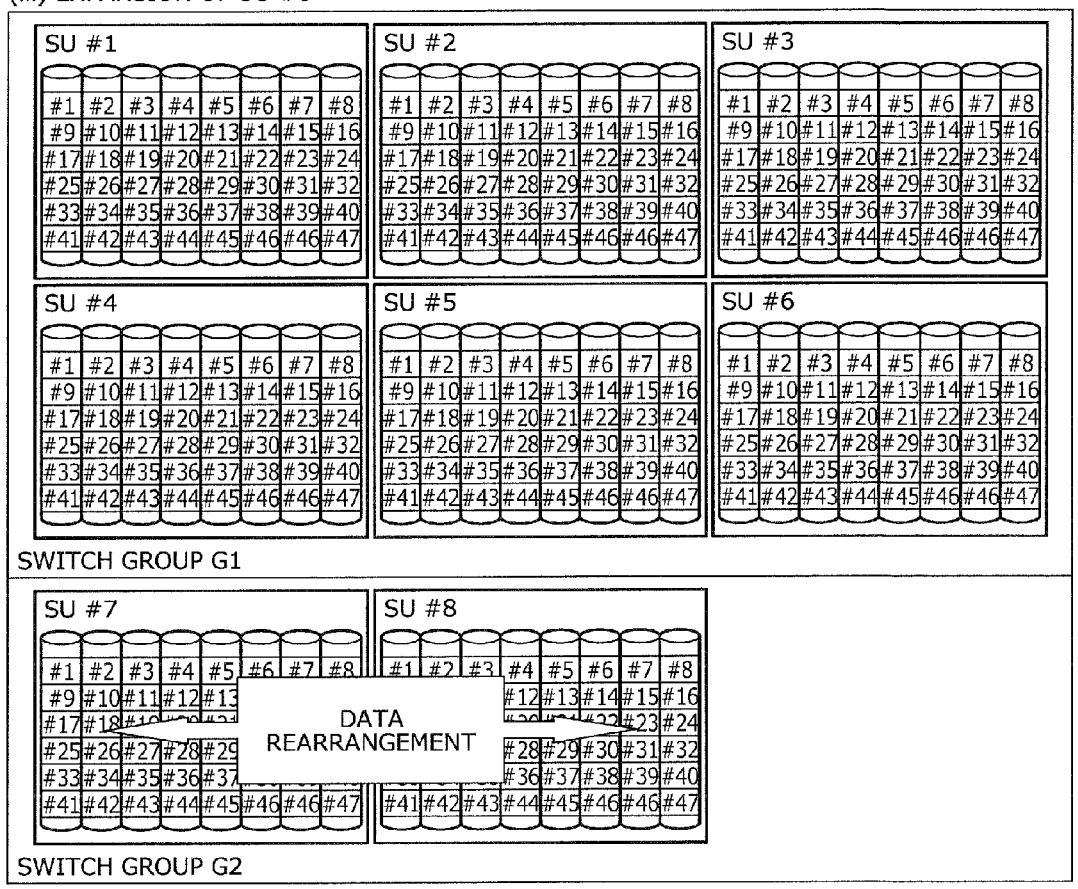

FIGS. 21 and 22 are explanatory views of an example of data rearrangement at the time of addition of SUs. In (i) of FIG. 21, the SU #6 is added to the switch group G1 (the SUs #1 to #5) in the storage system 100. The PU #1 performs data rearrangement in the switch group G1 until the SU #6 is added to the switch group G1.

In (ii) of FIG. 21, when the SU #7 is added to the storage system 100, the SW #1 (SW #2) is cascade-connected to the SW #3 (SW #4) to create the switch group G2. At the time of addition of the SU #7, only the SU #7 is added in the switch group G2. The PU #1 does not rearrange data across the switch groups G. Therefore, the PU #1 does not perform data rearrangement at the time of addition of the SU #7.

In (iii) of FIG. 22, the SU #8 is added to the switch group G2 (SU #7) in the storage system 100. In this case, the PU #1 performs data rearrangement in the switch group G2. By performing the data arrangement within a switch group G, the data access performance can be kept optimal, and the data rearrangement process amount can be reduced by minimizing the data rearrangement range (within a switch group G).

An example of a volume rearrangement process will be described. The PUs control the rearrangement process such that no trouble occurs with business operation consequent to the effects of the usage of internal line bandwidth and the CPU loads of the PUs due to segment migration caused by the rearrangement process.

For example, a PU (e.g., the PU #1) determines whether the number of accesses per second (IOPS: input output per second) by the business server BS reaches the maximum IOPS that can be processed by the PU. If the IOPS from the business server BS reaches the maximum IOPS, the PU gives priority to business IO without executing the rearrangement process.

On the other hand, if the IOPS from the business server BS does not reach the maximum IOPS, the PU executes the rearrangement process by utilizing available IOPS. The available IOPS is obtained by subtracting the current IOPS from the maximum IOPS. As a result, the rearrangement of volumes can be performed without interrupting business while the effect on business is minimized.

However, because of increases in the bandwidth utilization between a PU and SUs and the CPU load of a PU due to execution of the rearrangement process, it is conceivable that the IOPS of the business IO is reduced. Therefore, in addition to considering the difference between the current IOPS and the maximum IOPS of the PU, if a reduction rate of the current IOPS exceeds a predetermined proportion (e.g., 15 [%]) due to the rearrangement process, the PU may cull the rearrangement process so that the IOPS of the business can be maintained.

For example, if the current IOPS is greater than or equal to 95% of the maximum IOPS, the PU may introduce a sleep (e.g., wait about one to five [seconds]) during the process so as to suppress the rearrangement process as described below. Here, x and y denote the maximum IOPS of the PU and the current IOPS, respectively. The maximum IOPS of the PU is set in advance.

$0.95x \leq y$ sleep the rearrangement process $0.95x > y$ operate the rearrangement process If "0.85 (previous y)≤(current y)" is satisfied consequent to the operation of rearrangement, the PU introduces a sleep during the rearrangement process to suppress the effect on business, for example. It is noted that "previous y" is the current IOPS immediately before the rearrangement process, for example.

Various process procedures of the storage system 100 according to the example will be described. A node expansion process procedure of the storage system 100 will first be described. The node expansion process procedure of the storage system 100 will be described by taking the case of adding the expansion node N2 to the basic node N1.

Figure 23:
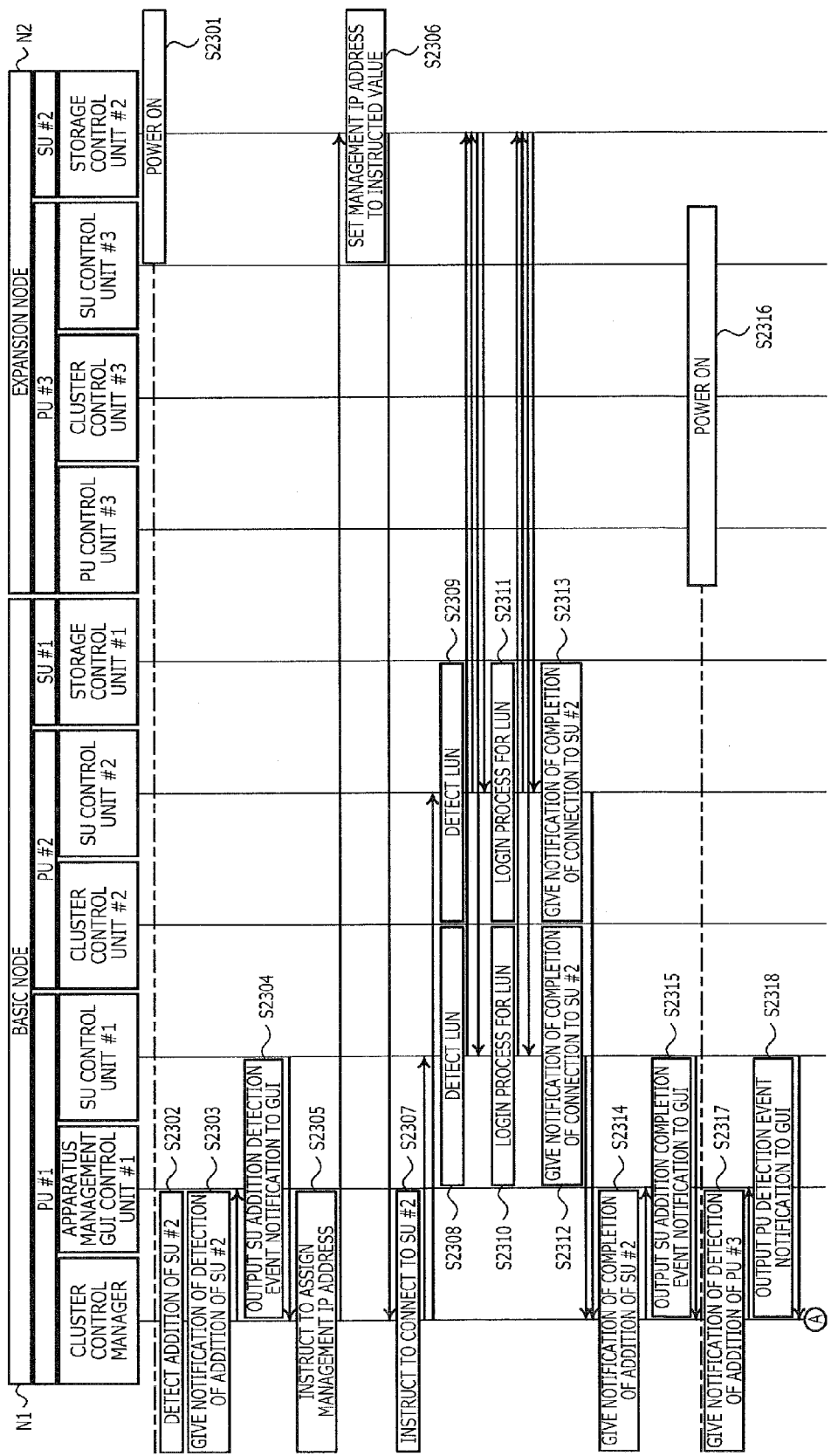
FIGS. 23 and 24 are sequence diagrams of an example of a node expansion process procedure of the storage system 100.
Figure 24:
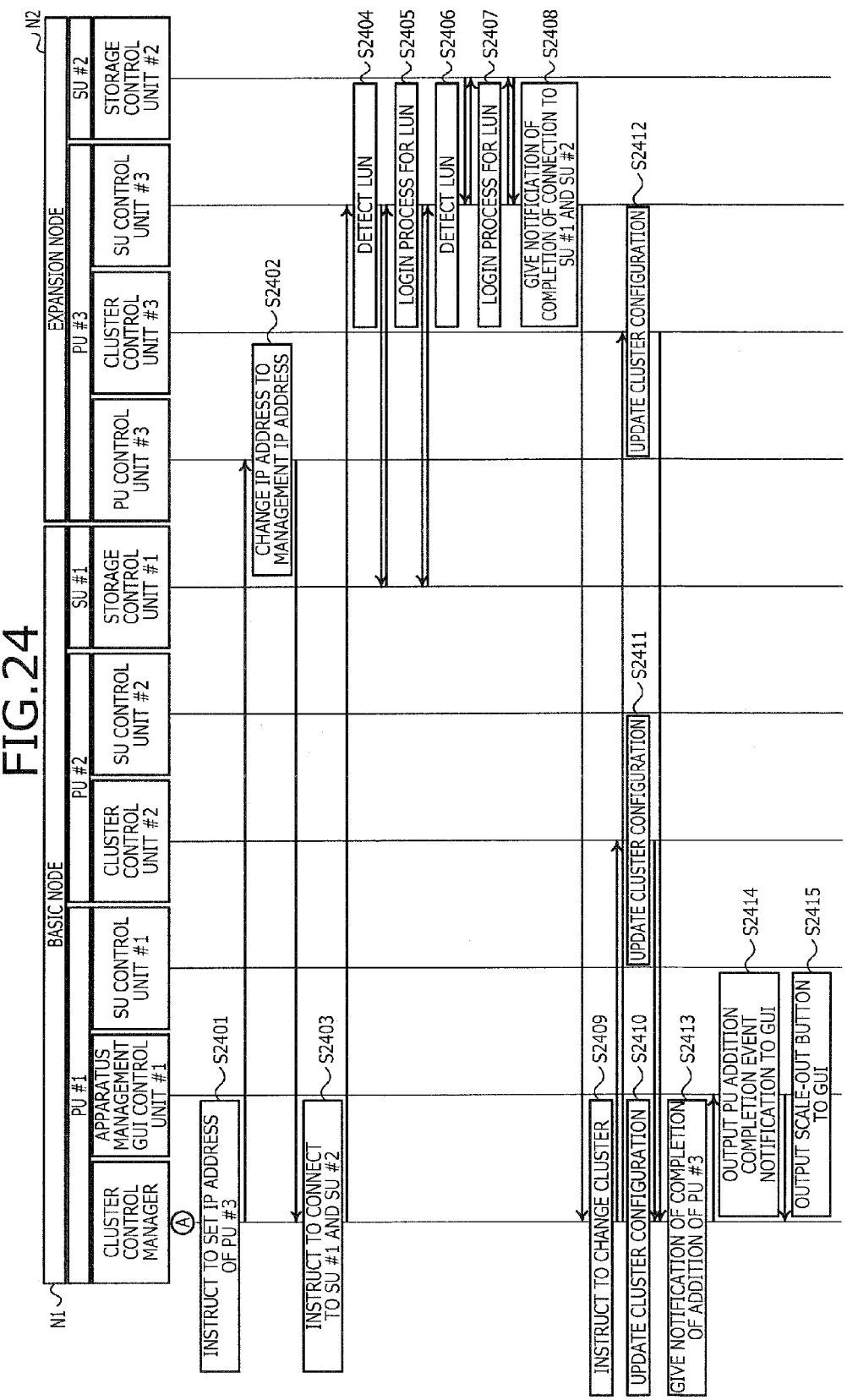
Figure 25:
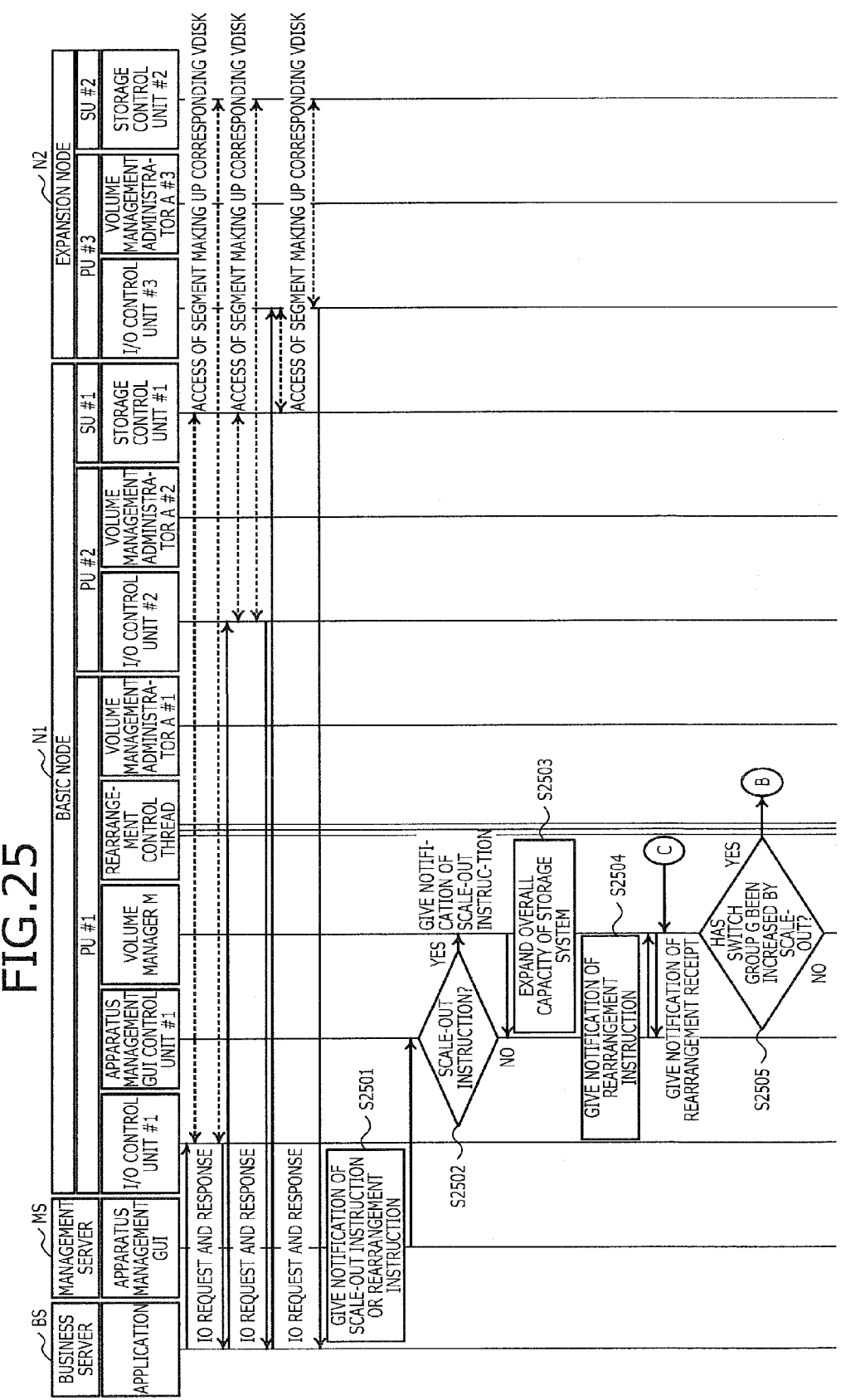
FIGS. 25, 26, 27, and 28 are sequence diagrams of an example of a rearrangement process procedure of the storage system 100.

FIGS. 23 and 24 are sequence diagrams of an example of the node expansion process procedure of the storage system 100. In the sequence diagram of FIG. 23, a customer engineer (CE) physically connects the expansion node N2 to the basic node N1 and powers on the SU #2 (step S2301).

The cluster control manager M detects the addition of the SU #2 (step S2302). The cluster control manager M notifies the apparatus management GUI control unit #1 of the detection of addition of the SU #2 (step S2303). The apparatus management GUI control unit #1 outputs SU addition detection event notification to the GUI of the management server MS (step S2304).

The cluster control manager M instructs the storage control unit #2 of the SU #2 to assign a new management IP address (step S2305). The storage control unit #2 of the SU #2 sets the management IP address to an instructed value (step S2306). The cluster control manager M instructs the SU control unit #1 of the PU #1 and the SU control unit #2 of the PU #2 to connect to the SU #2 (step S2307).

The SU control unit #1 makes an inquiry about the disk of the SU #2 to detect a LUN for a management DB and a LUN for user data of the SU #2 (step S2308). The SU control unit #2 makes an inquiry about the disk of the SU #2 to detect a LUN for a management DB and a LUN for user data of the SU #2 (step S2309). The SU control unit #1 executes a login process for the detected LUNs (step S2310). The SU control unit #2 executes a login process for the detected LUNs (step S2311).

The SU control unit #1 notifies the cluster control manager M of the completion of connection to the SU #2 (step S2312). The SU control unit #2 notifies the cluster control manager M of the completion of connection to the SU #2 (step S2313). The cluster control manager M notifies the apparatus management GUI control unit #1 of the completion of addition of the SU #2 (step S2314). The apparatus management GUI control unit #1 outputs SU addition completion event notification to the GUI of the management server MS (step S2315).

The CE powers on the PU #3 of the expansion node N2 (step S2316). When detecting the addition of the PU #3, the cluster control manager M notifies the apparatus management GUI control unit #1 of the detection of addition of the PU #3 (step S2317). The apparatus management GUI control unit #1 outputs PU detection event notification to the GUI of the management server MS (step S2318).

In the sequence diagram of FIG. 24, the cluster control manager M instructs the PU control unit #3 to set an IP address of the detected PU #3 (step S2401). The PU control unit #3 changes the IP address to the management IP address (step S2402). The cluster control manager M instructs the SU control unit #3 of the PU #3 to connect to the SU #1 and the SU #2 (step S2403).

The SU control unit #3 makes an inquiry about the disk of the SU #1 to detect a LUN for a management DB and a LUN for user data of the SU #1 (step S2404). The SU control unit #3 executes a login process for the detected LUNs (step S2405). The SU control unit #3 makes an inquiry about the disk of the SU #2 to detect a LUN for a management DB and a LUN for user data of the SU #2 (step S2406).

The SU control unit #3 executes a login process for the detected LUNs (step S2407). The SU control unit #3 notifies the cluster control manager M of the completion of connection to the SU #1 and the SU #2 (step S2408). The cluster control manager M instructs the cluster control unit #2 of the PU #2 and the cluster control unit #3 of the PU #3 to change a cluster (step S2409).

The cluster control manager M incorporates the PU #3 into cluster management information to update the cluster configuration to the PUs #1, #2, and #3 (step S2410). The cluster control unit #2 incorporates the PU #3 into cluster management information to update the cluster configuration to the PUs #1, #2, and #3 (step S2411). The cluster control unit #3 incorporates the PU #3 into cluster management information to update the cluster configuration to the PUs #1, #2, and #3 (step S2412).

The cluster control manager M notifies the apparatus management GUI control unit #1 of the completion of addition of the PU #3 (step S2413). The apparatus management GUI control unit #1 outputs a PU addition completion event notification to the GUI of the management server MS (step S2414). The apparatus management GUI control unit #1 outputs a scale-out button to the GUI of the management server MS (step S2415).

When a user clicks the "scale-out button" on the GUI of the management server MS to indicate approval of the completion of connection and internal apparatus incorporation, the expansion process is completed. As a result of the completion instruction of the scale-out, the storage capacity of the storage system 100 is increased by that of the SU #2 and new data can be stored on the SU #2.

For example, at step S2413, the cluster control manager M notifies the volume manager M of the completion of addition of the PU #3. When receiving notification of the completion of addition of the PU #3, the volume manager M groups the PUs and the SUs directly connected to the SWs in the storage system 100 to update the SW group management table 700.

A rearrangement process procedure of the storage system 100 will be described. For example, the rearrangement process is executed after the completion of scale-out of the storage system 100 or when a rearrangement instruction is made from the GUI screen of the management server MS.

FIGS. 25, 26, 27, and 28 are sequence diagrams of an example of the rearrangement process procedure of the storage system 100. In the sequence diagram of FIG. 25, the apparatus management GUI of the management server MS notifies the apparatus management GUI control unit #1 of the PU #1 of a scale-out instruction or a rearrangement instruction (step S2501). The notification of the scale-out instruction is made when the "scale-out button" on the GUI screen is clicked, for example. The notification of the rearrangement instruction is made when a "rearrangement button" on the GUI screen is clicked.

The apparatus management GUI control unit #1 of the PU #1 determines whether a scale-out instruction has been received (step S2502). If a scale-out instruction has been received (step S2502: YES), the apparatus management GUI control unit #1 notifies the volume manager M of the scale-out instruction, and the volume manager M adds the capacity of the added SU #2 to the overall capacity of the storage system 100 to make the area of the SU #2 available (step S2503).

On the other hand, if a rearrangement instruction has been received (step S2502: NO), the apparatus management GUI control unit #1 notifies the volume manager M of the rearrangement instruction (step S2504). The volume manager M refers to the SW group management table 700 to determine whether a switch group G has been increased by scale-out (step S2505).

If a switch group G has been increased (step S2505: YES), the volume manager M goes to step S2803. On the other hand, if a switch group G has not been increased (step S2505: NO), the volume manager M goes to step S2601 depicted in FIG. 26.

Figure 26:
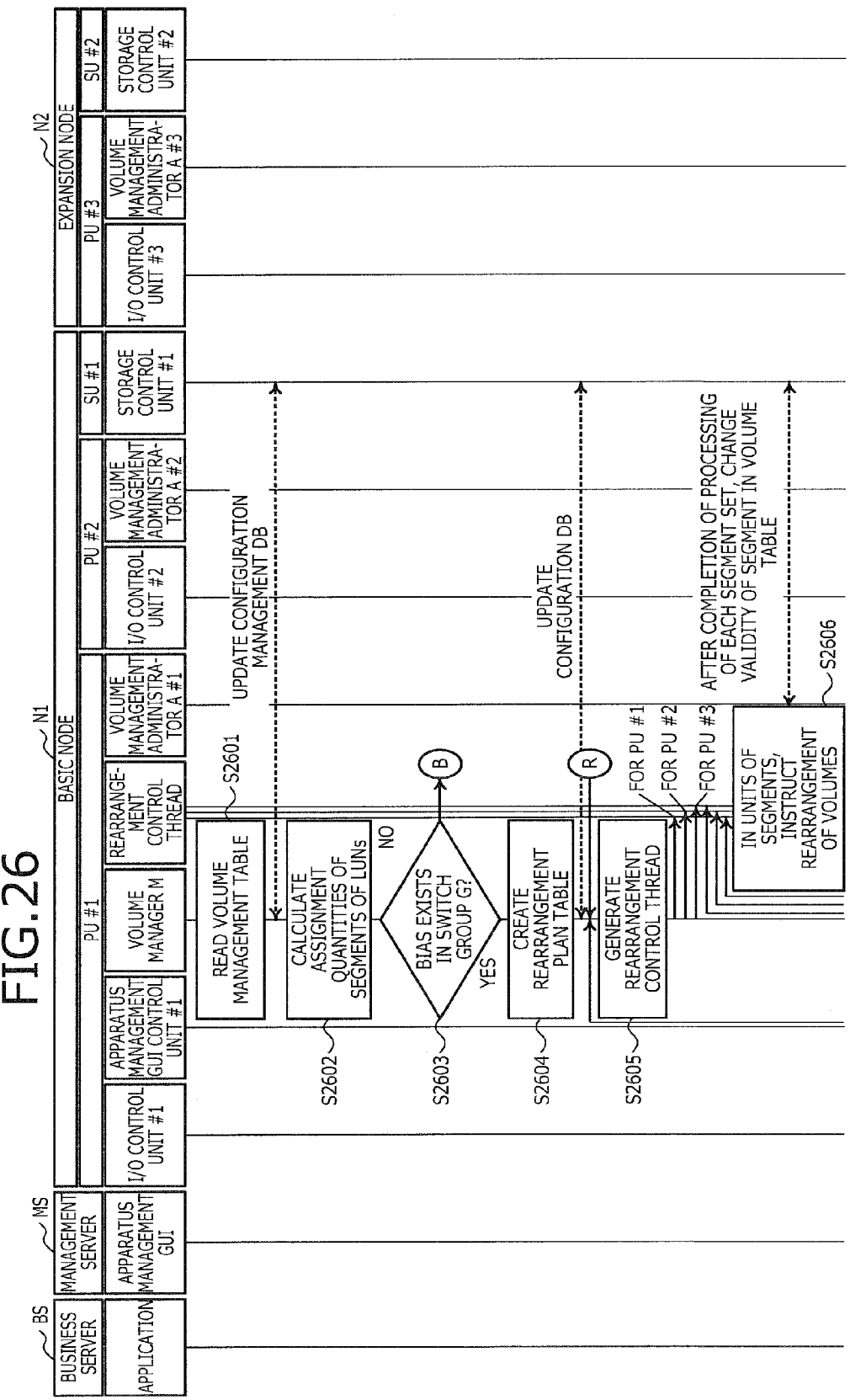

In the sequence diagram of FIG. 26, the volume manager M reads the volume management table 710 from the configuration management DB (step S2601). The volume manager M refers to the volume management table 710 to calculate the assignment quantities q of segments of the LUNs included in the SUs belonging to each of the switch groups G in the storage system 100 (step S2602).

The volume manager M determines based on the calculated assignment quantities q of segments of the LUNs, whether bias exists in the assignment quantities q of segments of the LUNs included in the SUs belonging to each of the switch groups G in the storage system 100 (step S2603).

If no bias exists in the switch groups G (step S2603: NO), the volume manager M goes to step S2803 of FIG. 28. On the other hand, if bias exists in the switch groups G (step S2603: YES), the volume manager M develops a rearrangement plan for each switch group G to create the rearrangement plan table 720 (step S2604). In this case, the volume manager M sets the rearrangement status of a segment to be rearranged in the rearrangement plan table 720 to "awaiting rearrangement".

The volume manager M refers to the rearrangement plan table 720 to generate a rearrangement control thread for the PUs #1, #2, and #3 (step S2605). The rearrangement control thread for the PUs #1, #2, and #3 instructs the volume management administrators A #1, #2, and #3 of the PUs #1, #2, and #3 to rearrange volumes instructed by the volume manager M according to segment (step S2606).

For example, the rearrangement control thread for the PUs #1, #2, and #3 notifies the volume management administrators A #1, #2, and #3 of the PUs #1, #2, and #3, of the information of a disk to be rearranged (information for identifying a disk; a segment to be migrated) and the information of a migration destination.

Figure 27:
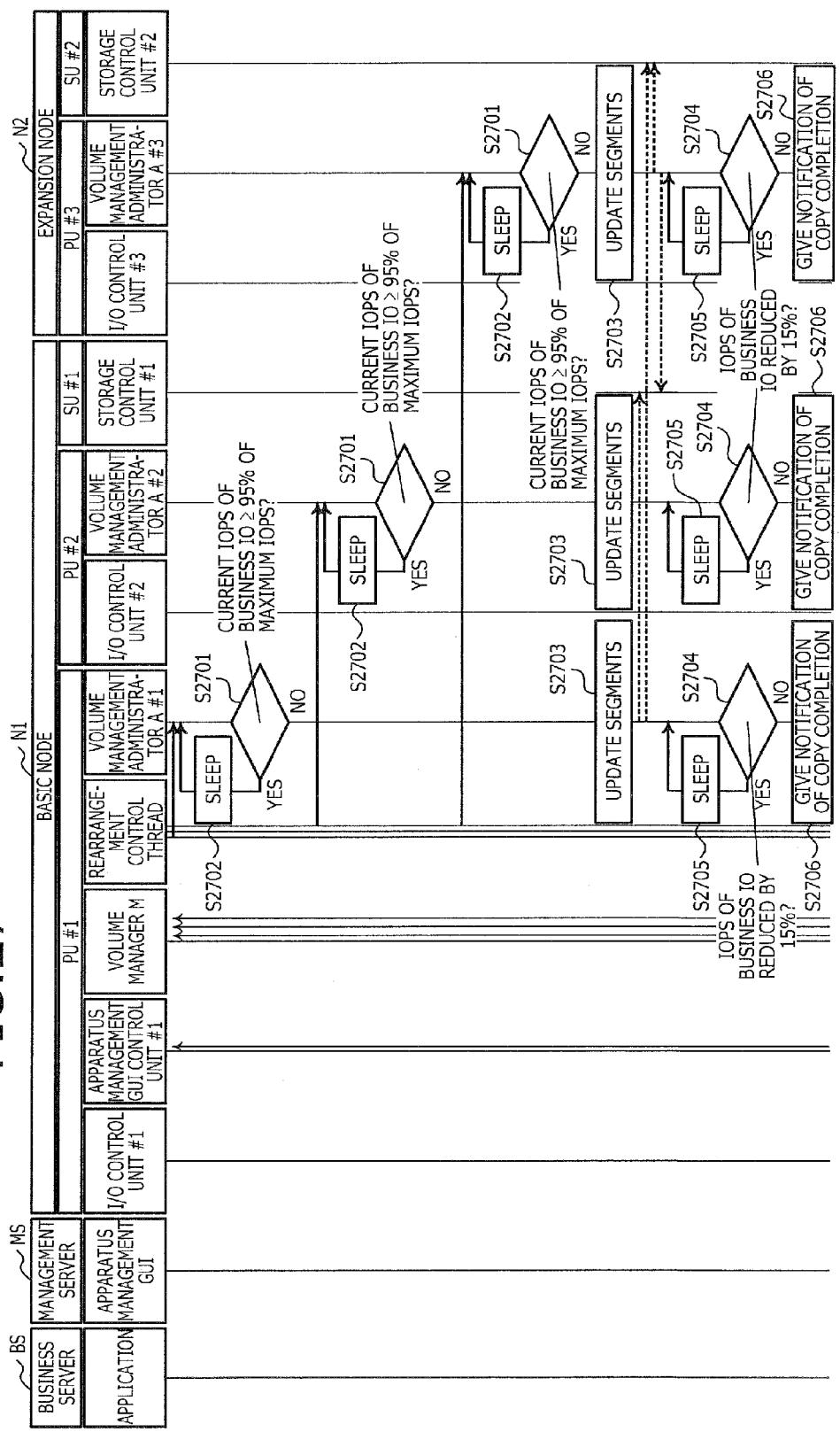

In the sequence diagram of FIG. 27, each of the volume management administrators A #1, #2, and #3 determines if the current IOPS of the business IO is greater than or equal to 95% of the maximum IOPS (step S2701). If the current IOPS is greater than or equal to 95% of the maximum IOPS (step S2701: YES), each of the volume management administrators A #1, #2, and #3 sleeps for a certain period (step S2702) and returns to step S2701.

On the other hand, if the current IOPS is less than 95% of the maximum IOPS (step S2701: NO), each of the volume management administrators A #1, #2, and #3 copies segments according to the instruction to update the instructed segments (step S2703).

Each of the volume management administrators A #1, #2, and #3 determines whether the IOPS of the business IO has been reduced by 15% (step S2704). If the IOPS has been reduced by 15% (step S2704: YES), each of the volume management administrators A #1, #2, and #3 sleeps for a certain period (step S2705) and returns to step S2704.

On the other hand, if the IOPS has not been reduced by 15% (step S2704: NO), each of the volume management administrators A #1, #2, and #3 notifies the rearrangement control thread for the PUs #1, #2, and #3 giving the instruction, of the copy completion (step S2706). The rearrangement control thread notified of the copy completion sets the rearrangement status of a segment of the copy completion in the rearrangement plan table 720 to "rearrangement completed".

Figure 28:
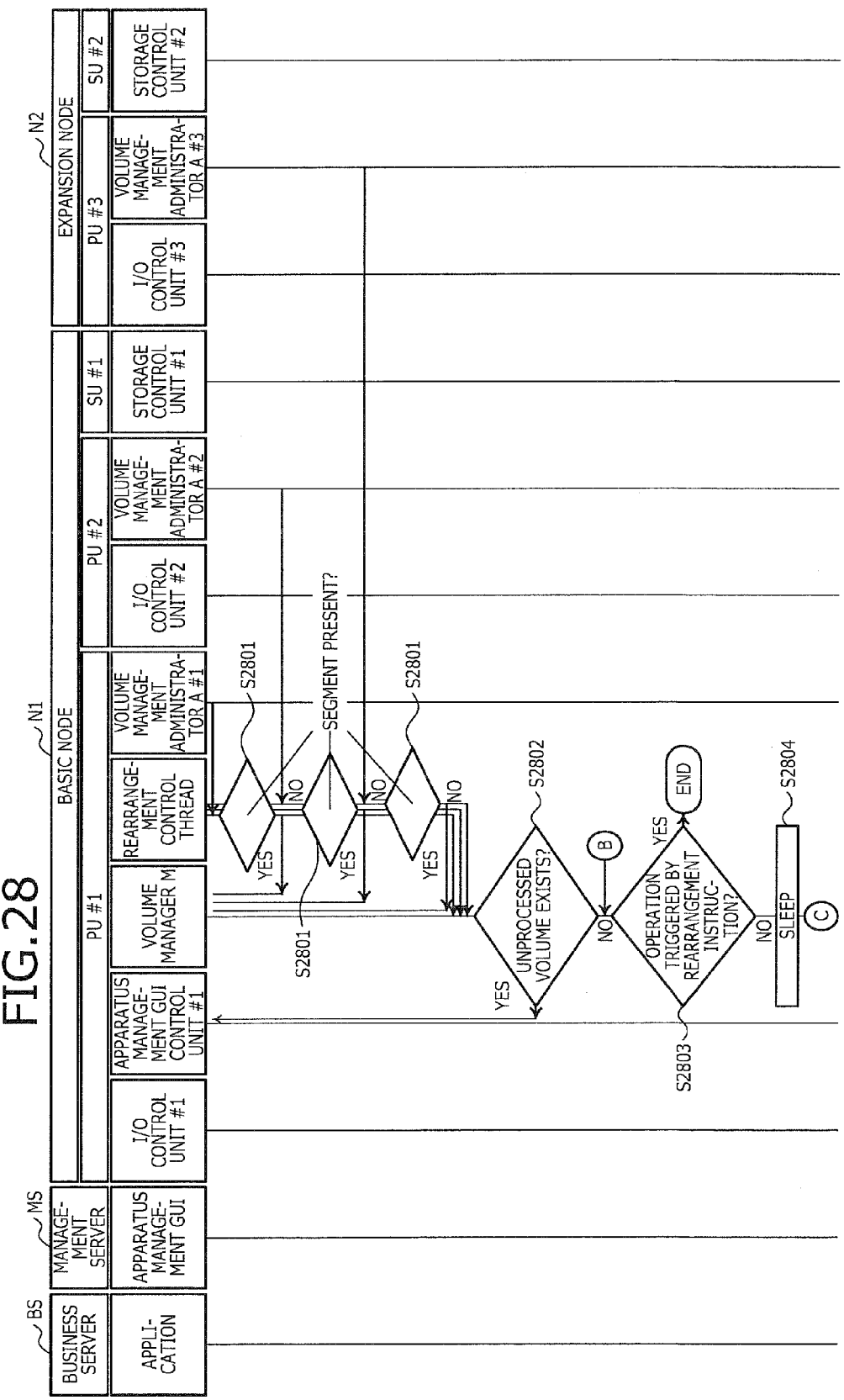

In the sequence diagram of FIG. 28, the rearrangement control thread for the PUs #1, #2, and #3 refers to the rearrangement plan table 720 to determine whether a remaining segment that has not been re-arranged is present (step S2801). If a remaining segment present (step S2801: YES), the rearrangement control thread for the PUs #1, #2, and #3 returns to step S2606 depicted in FIG. 26.

On the other hand, if no remaining segment is present (step S2801: NO), the rearrangement control thread for the PUs #1, #2, and #3 notifies the volume manager M of the completion of volume rearrangement. The volume manager M refers to the rearrangement plan table 720 to determine whether an unprocessed volume exists (step S2802).

If an unprocessed volume exists (step S2802: YES), the volume manager M returns to step S2605 depicted in FIG. 26. On the other hand, if no unprocessed volume is present (step S2802: NO), the volume manager M determines whether the operation was triggered by a rearrangement instruction (step S2803).

If the operation was triggered by a rearrangement instruction (step S2803: YES), the storage system 100 terminates a series of operations. On the other hand, if the operation was triggered by a scale-out instruction (step S2803: NO), the volume manager M sleeps for a certain period (step S2804) and returns to step S2505 depicted in FIG. 25.

As a result, the volumes can be rearranged so as to equalize the assignment quantities q of segments of the LUNs between SUs belonging to the switch groups G. If the operation was triggered by the scale-out instruction, determination can regularly be made on whether bias exists in the assignment quantities q of segments of the LUNs included in the SUs belonging to each of the switch groups G in the storage system 100, so as to rearrange the volumes.

A rearrangement stop process procedure of the storage system 100 will be described. First, description will be made of the rearrangement stop process procedure in a case where a user of the management server MS gives a stop instruction for the rearrangement process.

Figure 29:
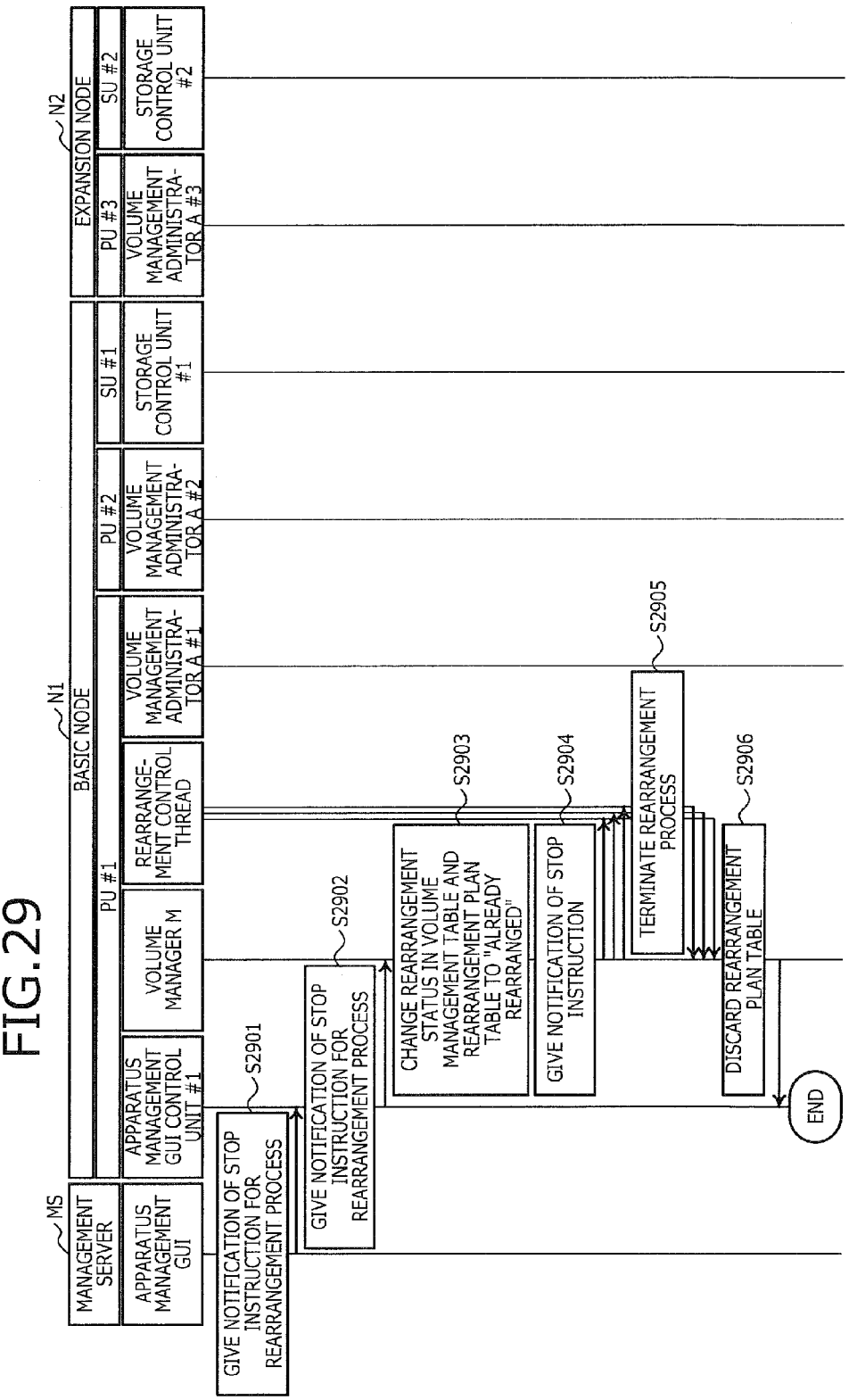
FIG. 29 is a sequence diagram of an example of a first rearrangement stop process procedure of the storage system 100.

FIG. 29 is a sequence diagram of an example of a first rearrangement stop process procedure of the storage system 100. In the sequence diagram of FIG. 29, upon receiving a stop instruction for the rearrangement process, the apparatus management GUI of the management server MS notifies the apparatus management GUI control unit #1 of the PU #1 of the stop instruction for the rearrangement process (step S2901).

Upon receiving the stop instruction for the rearrangement process, the apparatus management GUI control unit #1 notifies the volume manager M of the stop instruction for the rearrangement process (step S2902). The volume manager M changes the rearrangement status in the volume management table 710 and the rearrangement plan table 720 to "already rearranged" (step S2903).

The volume manager M notifies the rearrangement control thread for the PUs #1, #2, and #3 executing the rearrangement process, of the stop instruction (step S2904). The rearrangement control thread for the PUs #1, #2, and #3 terminates the rearrangement process under progress (step S2905). The volume manager M discards the rearrangement plan table 720 (step S2906) and the storage system 100 terminates a series of operations. This enables the user of the management server MS to terminate the rearrangement process being executed, at an arbitrary timing.

Description will be made of the rearrangement stop process procedure of the storage system 100 in a case of occurrence of a rearrangement stop event. The rearrangement stop event may be, for example, an execution of new scale-out, lock-out of a RAID group, and deletion of a LUN in an SU.

Figure 30:
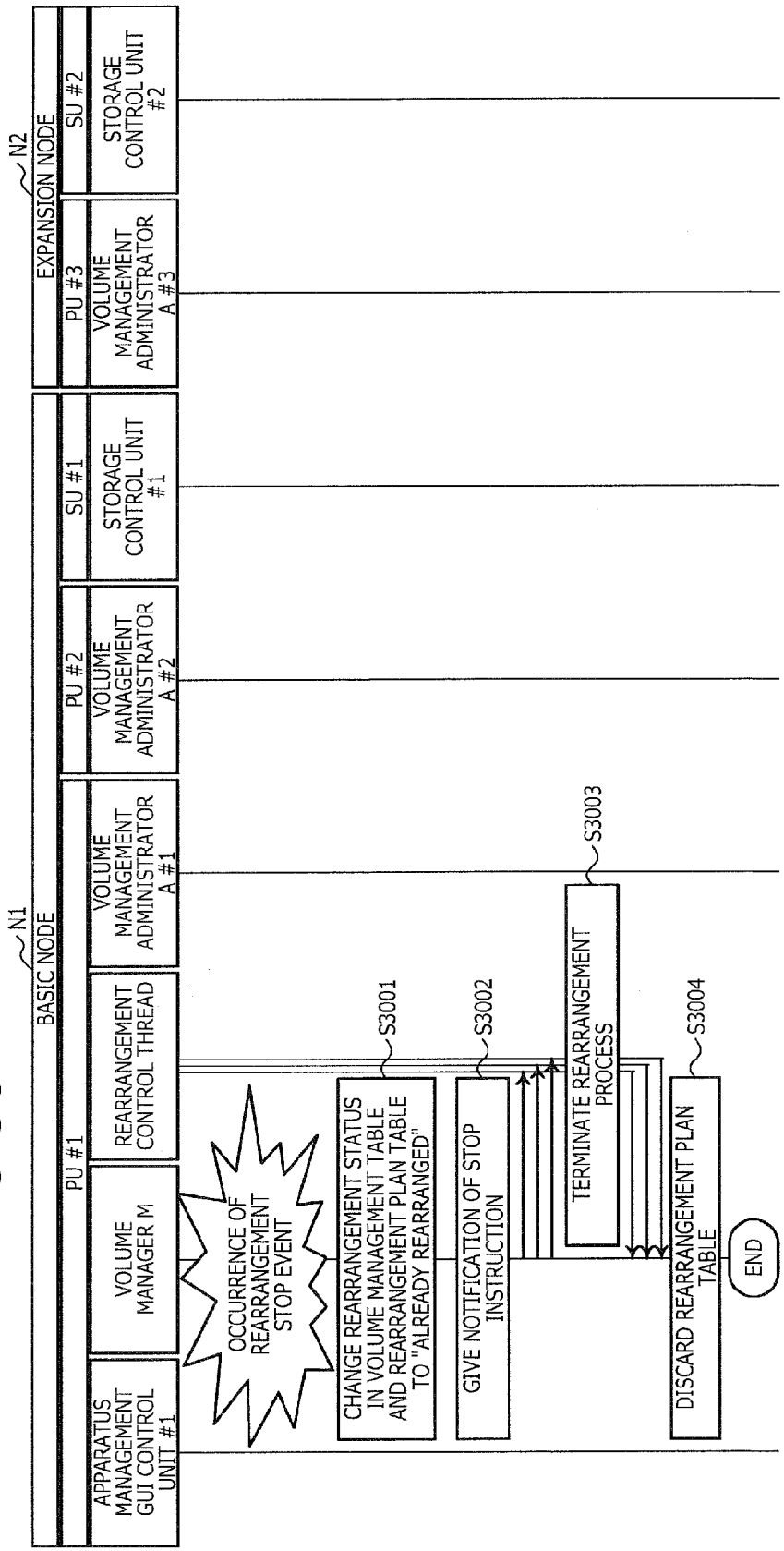
FIG. 30 is a sequence diagram of an example of a second rearrangement stop process procedure of the storage system 100.

FIG. 30 is a sequence diagram of an example of a second rearrangement stop process procedure of the storage system 100. In the sequence diagram of FIG. 30, when a rearrangement stop event occurs, the volume manager M changes the rearrangement status in the volume management table 710 and the rearrangement plan table 720 to "already rearranged" (step S3001).

The volume manager M notifies the rearrangement control thread for the PUs #1, #2, and #3 executing the rearrangement process, of the stop instruction (step S3002). The rearrangement control thread for the PUs #1, #2, and #3 terminates the rearrangement process under progress (step S3003). The volume manager M discards the rearrangement plan table 720 (step S3004) and the storage system 100 terminates a series of operations. As a result, when a rearrangement stop event occurs, the rearrangement process being executed can be terminated.

A rearrangement suspension process procedure of the storage system 100 will be described. For example, the rearrangement suspension process is executed if it is desirable to temporarily stop the rearrangement process because of maintenance, inspection, etc. of the PUs and SUs.

Figure 31:
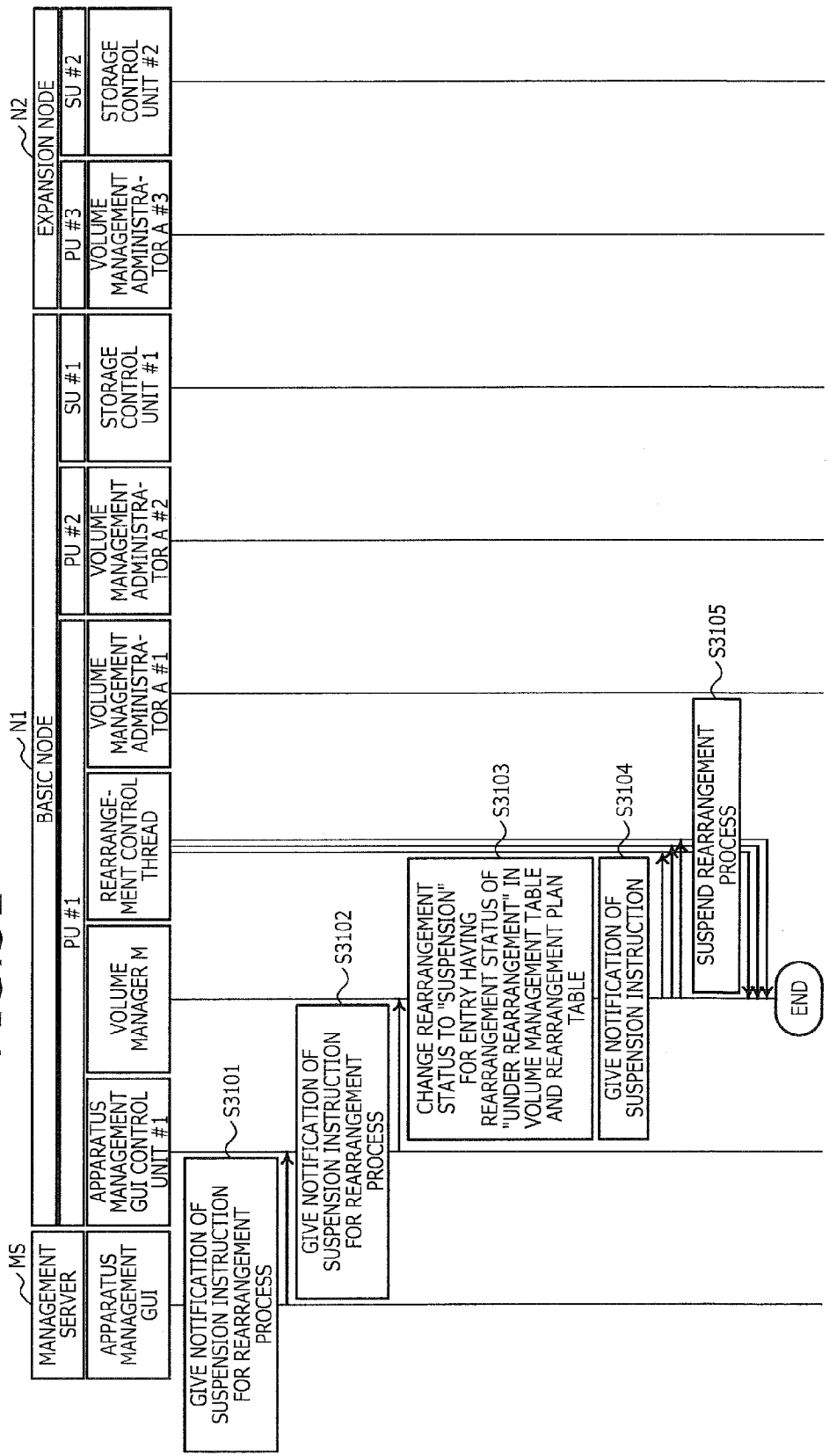
FIG. 31 is a sequence diagram of an example of a rearrangement suspension process procedure of the storage system 100.

FIG. 31 is a sequence diagram of an example of the rearrangement suspension process procedure of the storage system 100. In the sequence diagram of FIG. 31, upon receiving a suspension instruction for the rearrangement process, the apparatus management GUI of the management server MS notifies the apparatus management GUI control unit #1 of the PU #1, of the suspension instruction for the rearrangement process (step S3101).

Upon receiving the suspension instruction for the rearrangement process, the apparatus management GUI control unit #1 notifies the volume manager M of the suspension instruction (step S3102). The volume manager M changes the rearrangement status to "suspension" for an entry having the rearrangement status of "under rearrangement" in the volume management table 710 and the rearrangement plan table 720 (step S3103).

The volume manager M notifies the rearrangement control thread for the PUs #1, #2, and #3 executing the rearrangement process, of the suspension instruction (step S3104). The rearrangement control thread for the PUs #1, #2, and #3 terminates the rearrangement process under progress (step S3105) and the storage system 100 suspends a series of operations. This enables the user of the management server MS to suspend the rearrangement process being executed, at an arbitrary timing.

A rearrangement resumption process procedure of the storage system 100 will be described. For example, the rearrangement resumption process is executed if rearrangement is resumed after the rearrangement process is temporarily stopped because of maintenance, inspection, etc. of the PUs and SUs.

Figure 32:
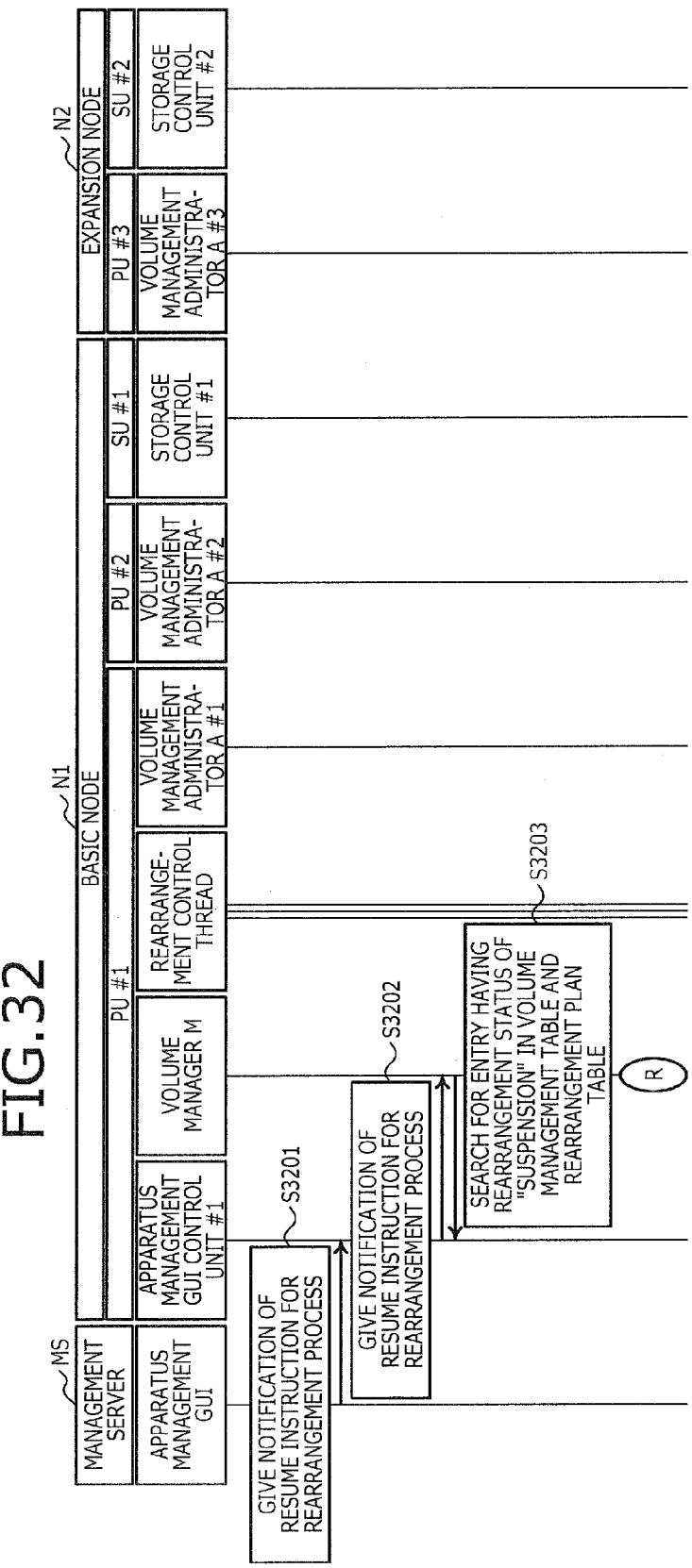
FIG. 32 is a sequence diagram of an example of a rearrangement resumption process procedure of the storage system 100.

FIG. 32 is a sequence diagram of an example of the rearrangement resumption process procedure of the storage system 100. In the sequence diagram of FIG. 32, upon receiving a resume instruction for the rearrangement process, the apparatus management GUI of the management server MS notifies the apparatus management GUI control unit #1 of the PU #1, of the resume instruction for the rearrangement process (step S3201).

Upon receiving the resume instruction for the rearrangement process, the apparatus management GUI control unit #1 notifies the volume manager M of the resume instruction for the rearrangement process (step S3202). The volume manager M searches for an entry having the rearrangement status of "suspension" in the volume management table 710 and the rearrangement plan table 720 (step S3203) and goes to step S2605 depicted in FIG. 26. This enables the user of the management server MS to resume the suspended rearrangement process at arbitrary timing.

As described, for each switch group of the storage system 100, the storage system 100 according to this example can reassign the data stored before scale-out, to all the SUs included in the switch groups G. This enables an improvement of access performance corresponding to the potential of the storage system 100 after the scale-out.

The storage control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

An aspect of the present invention produces an effect that deterioration in access performance with respect to data distributed and arranged in a system can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising:
a memory unit configured to store assignment information that includes assignment states of memory areas of storage units in a system in which switches that connect the storage units with storage control apparatuses that control the storage units are cascade-connected to each other; and
a processor configured
to group the storage control apparatuses and the storage units directly connected to the switches,
to provide based on the assignment information, rearrangement control of memory areas assigned in the storage units belonging to each group, according to a degree of bias among the assigned memory areas in the storage units belonging to each group,
to calculate based on the assignment information, a difference in memory capacity of the assigned memory areas, the difference being between memory devices included in the storage units belonging to each group and the difference being between a memory device among the memory devices and having a largest memory capacity of the assigned memory areas and a memory device among the memory devices and having a smallest memory capacity of the assigned memory areas,
to determine based on the calculated difference, whether a given bias exists in the assignment states of the assigned memory areas in the storage units belonging to each group and that the given bias exists when the calculated difference is greater than or equal to a predetermined proportion of the memory capacity of the memory areas assigned to the memory device that is largest, and
to provide based on a determination that the given bias exists, the rearrangement control of the assigned memory areas based on the assignment information.

2. The storage control apparatus according to claim 1, wherein
the processor determines that the given bias exists when the calculated difference is greater than or equal to the predetermined proportion of the memory capacity of the memory areas assigned to the memory device that is largest, and is greater than or equal to a given size.

3. The storage control apparatus according to claim 1, wherein
the assignment information includes assignment information of segments assigned to the memory areas of the storage units belonging to each group, and
the processor calculates the difference based on a count of the assigned segments.

4. The storage control apparatus according to claim 1, wherein
the processor creates based on the assignment information, a rearrangement plan for the memory areas assigned in the storage units belonging to each group and provides according to the created rearrangement plan, the rearrangement control of the memory areas assigned in the storage units belonging to each group.

5. The storage control apparatus according to claim 1, wherein
the processor periodically determines based on the assignment information, whether the given bias exists in the assignment states of the memory areas assigned in the storage units belonging to each group.

6. A storage control method comprising:
grouping storage control apparatuses and storage units directly connected to switches in a system in which the switches connecting the storage units with the storage control apparatuses that control the storage units are cascade connected;
referring to a memory unit storing assignment information that includes assignment states of memory areas of the storage units in the system and providing rearrangement control of the memory areas assigned in the storage units belonging to each group;
providing the rearrangement control of the memory areas, according to a degree of bias among the assigned memory areas in the storage units belonging to each group;
calculating based on the assignment information, a difference in memory capacity of the assigned memory areas, the difference being between memory devices included in the storage units belonging to each group and the difference being between a memory device among the memory devices and having a largest memory capacity of the assigned memory areas and a memory device among the memory devices and having a smallest memory capacity of the assigned memory areas;
determining based on the calculated difference, whether a given bias exists in the assignment states of the assigned memory areas in the storage units belonging to each group and that the given bias exists when the calculated difference is greater than or equal to a predetermined proportion of the memory capacity of the memory areas assigned to the memory device that is largest; and
providing based on a determination that the given bias exists, the rearrangement control of the assigned memory areas based on the assignment information, wherein
the control method is executed by a computer.

7. A non-transitory, computer-readable recording medium storing a storage control program that causes a computer to execute a process comprising:
grouping storage control apparatuses and storage units directly connected to switches in a system in which the switches connecting the storage units with the storage control apparatuses that control the storage units are cascade connected;
referring to a memory unit storing assignment information that includes assignment states of memory areas of the storage units in the system and providing rearrangement control of the memory areas assigned in the storage units belonging to each group;
providing the rearrangement control of the memory areas, according to a degree of bias among the assigned memory areas in the storage units belonging to each group;
calculating based on the assignment information, a difference in memory capacity of the assigned memory areas, the difference being between memory devices included in the storage units belonging to each group and the difference being between a memory device among the memory devices and having a largest memory capacity of the assigned memory areas and a memory device among the memory devices and having a smallest memory capacity of the assigned memory areas;
determining based on the calculated difference, whether a given bias exists in the assignment states of the assigned memory areas in the storage units belonging to each group and that the given bias exists when the calculated difference is greater than or equal to a predetermined proportion of the memory capacity of the memory areas assigned to the memory device that is largest; and providing based on a determination that the given bias exists, the rearrangement control of the assigned memory areas based on the assignment information.

* * * * *